US012601690B2

(12) United States Patent
Sheps et al.

(10) Patent No.: US 12,601,690 B2
(45) Date of Patent: Apr. 14, 2026

(54) SYSTEM AND METHOD FOR GRADING CLARITY OF GEMSTONES

(71) Applicant: SARINE TECHNOLOGIES LTD., Hod HaSharon (IL)

(72) Inventors: Ran Sheps, Hod HaSharon (IL); Itamar Kofman, Hod HaSharon (IL); Avi Kerner, Hod HaSharon (IL)

(73) Assignee: SARINE TECHNOLOGIES LTD. (IL)

( * ) Notice: Subject to any disclaimer, the term of this patent is extended or adjusted under 35 U.S.C. 154(b) by 232 days.

(21) Appl. No.: 18/290,511

(22) PCT Filed: May 16, 2022

(86) PCT No.: PCT/IB2022/054534
§ 371 (c)(1),
(2) Date: Nov. 14, 2023

(87) PCT Pub. No.: WO2022/243840
PCT Pub. Date: Nov. 24, 2022

(65) Prior Publication Data
US 2024/0255434 A1 Aug. 1, 2024

Related U.S. Application Data

(60) Provisional application No. 63/189,185, filed on May 16, 2021.

(51) Int. Cl.
*G01N 21/87* (2006.01)

(52) U.S. Cl.
CPC ..... *G01N 21/87* (2013.01); *G01N 2201/0633* (2013.01)

(58) Field of Classification Search
CPC ........... G01N 2201/0633; G01N 21/87; G01N 21/64; G02B 21/0016; G02B 21/082
See application file for complete search history.

(56) References Cited

U.S. PATENT DOCUMENTS

2005/0117145 A1* 6/2005 Altman .................. G01N 21/87
356/30
2005/0190356 A1 9/2005 Sasian et al.
(Continued)

OTHER PUBLICATIONS

Search Report and Written Opinion—Corresponding PCT Application No. PCT/IB2022/054534, dated Jul. 29, 2022, 14 pages.

*Primary Examiner* — Kara E. Geisel
*Assistant Examiner* — Christina I Xing
(74) *Attorney, Agent, or Firm* — ISUS INTELLECTUAL PROPERTY PLLC; Anthony Jason Mirabito

(57) ABSTRACT

Systems and methods for grading a gemstone including its clarity are presented. An image capturing device disposed to capture images along a line of sight: a holder to support the gemstone thereon; a manipulator arm, carrying the holder, configured to rotate along a roll axis, and allow for rotation of the holder along a pitch axis: an illumination sub-system comprising a direct illumination arrangement, a dark-field illumination arrangement, and a facet illumination arrangement; and a controller arrangement configured to control the illumination arrangements to generate a plurality of illumination patterns for the gemstone, control the manipulator arm to position the holder for a plurality of orientations of the gemstone, control the image capturing device to capture an image of each of the generated illumination patterns, each of the orientations and each of one or more depths of focus, and process the captured images to grade the gemstone.

14 Claims, 22 Drawing Sheets

(56) References Cited

U.S. PATENT DOCUMENTS

| | | | |
|---|---|---|---|
| 2010/0086179 A1* | 4/2010 | Verboven | G06T 7/0004 |
| | | | 382/173 |
| 2010/0111354 A1 | 5/2010 | Hornabrook et al. | |
| 2013/0016210 A1* | 1/2013 | Smith | G01N 33/389 |
| | | | 348/135 |
| 2013/0038859 A1 | 2/2013 | Verboven et al. | |

* cited by examiner

4000

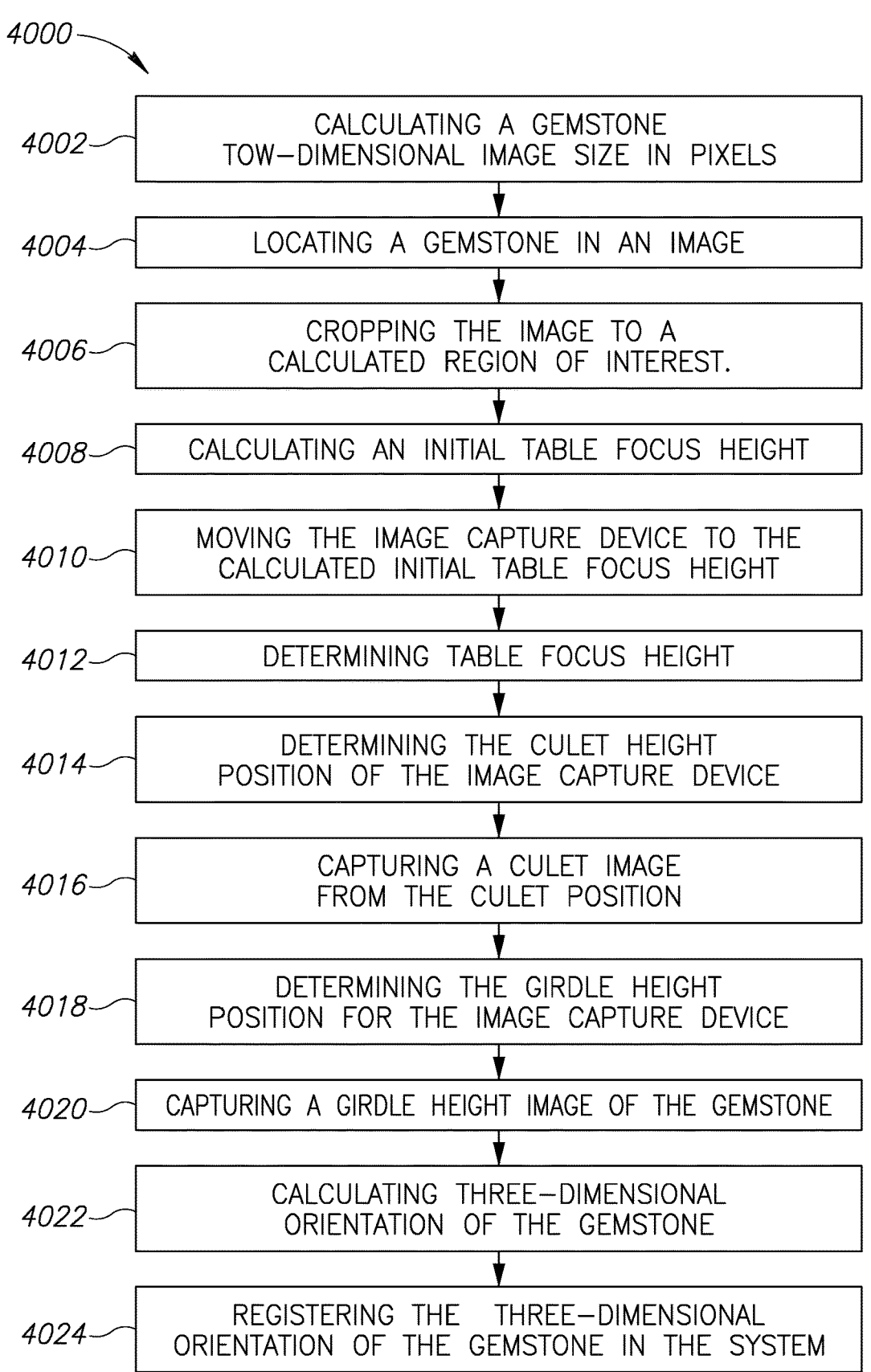

| | |
|---|---|
| 4002 | CALCULATING A GEMSTONE TOW–DIMENSIONAL IMAGE SIZE IN PIXELS |
| 4004 | LOCATING A GEMSTONE IN AN IMAGE |
| 4006 | CROPPING THE IMAGE TO A CALCULATED REGION OF INTEREST. |
| 4008 | CALCULATING AN INITIAL TABLE FOCUS HEIGHT |
| 4010 | MOVING THE IMAGE CAPTURE DEVICE TO THE CALCULATED INITIAL TABLE FOCUS HEIGHT |
| 4012 | DETERMINING TABLE FOCUS HEIGHT |
| 4014 | DETERMINING THE CULET HEIGHT POSITION OF THE IMAGE CAPTURE DEVICE |
| 4016 | CAPTURING A CULET IMAGE FROM THE CULET POSITION |
| 4018 | DETERMINING THE GIRDLE HEIGHT POSITION FOR THE IMAGE CAPTURE DEVICE |
| 4020 | CAPTURING A GIRDLE HEIGHT IMAGE OF THE GEMSTONE |
| 4022 | CALCULATING THREE–DIMENSIONAL ORIENTATION OF THE GEMSTONE |
| 4024 | REGISTERING THE THREE–DIMENSIONAL ORIENTATION OF THE GEMSTONE IN THE SYSTEM |

LOS

640

634

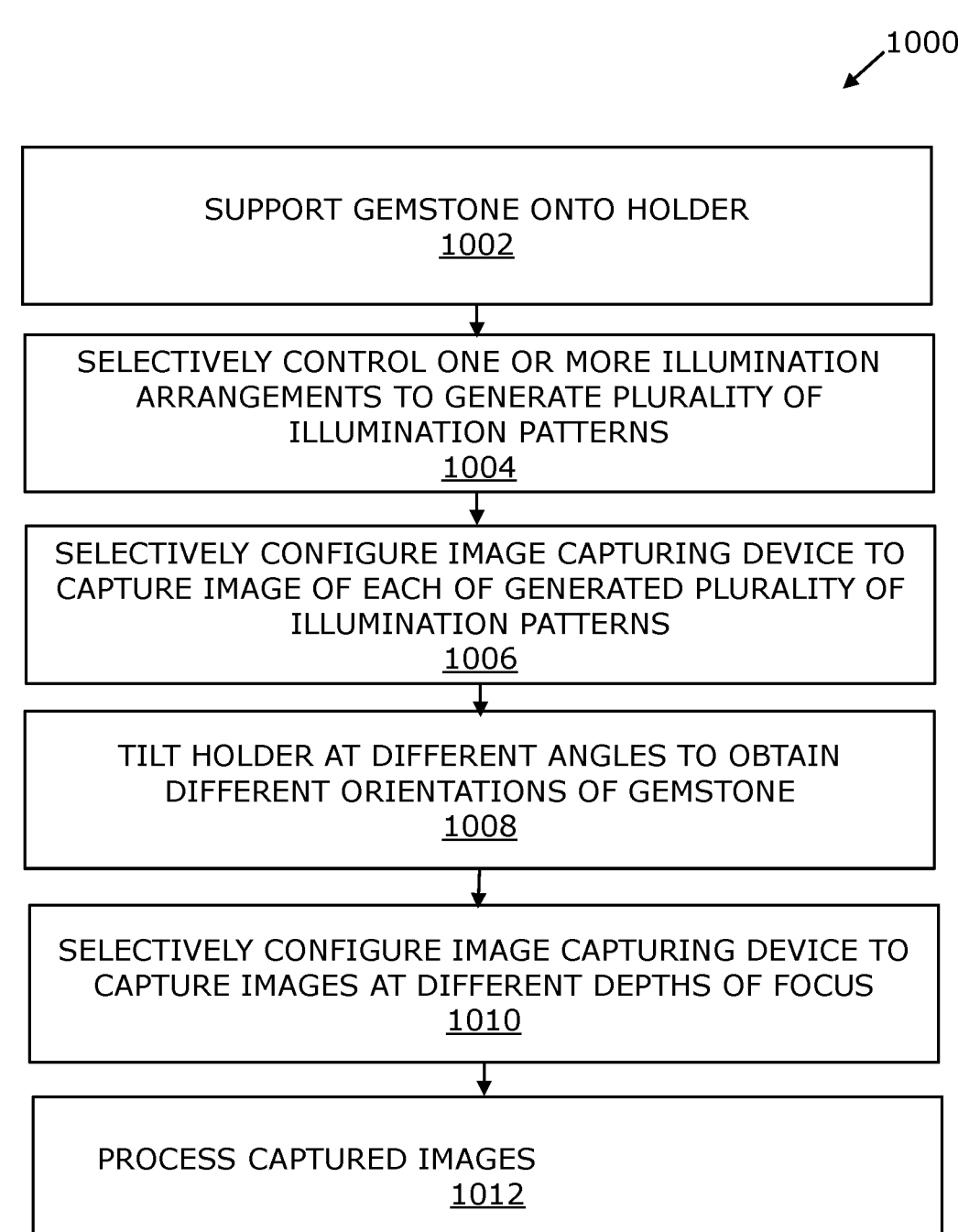

1000

SUPPORT GEMSTONE ONTO HOLDER
1002

SELECTIVELY CONTROL ONE OR MORE ILLUMINATION
ARRANGEMENTS TO GENERATE PLURALITY OF
ILLUMINATION PATTERNS
1004

SELECTIVELY CONFIGURE IMAGE CAPTURING DEVICE TO
CAPTURE IMAGE OF EACH OF GENERATED PLURALITY OF
ILLUMINATION PATTERNS
1006

TILT HOLDER AT DIFFERENT ANGLES TO OBTAIN
DIFFERENT ORIENTATIONS OF GEMSTONE
1008

SELECTIVELY CONFIGURE IMAGE CAPTURING DEVICE TO
CAPTURE IMAGES AT DIFFERENT DEPTHS OF FOCUS
1010

PROCESS CAPTURED IMAGES
1012

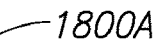
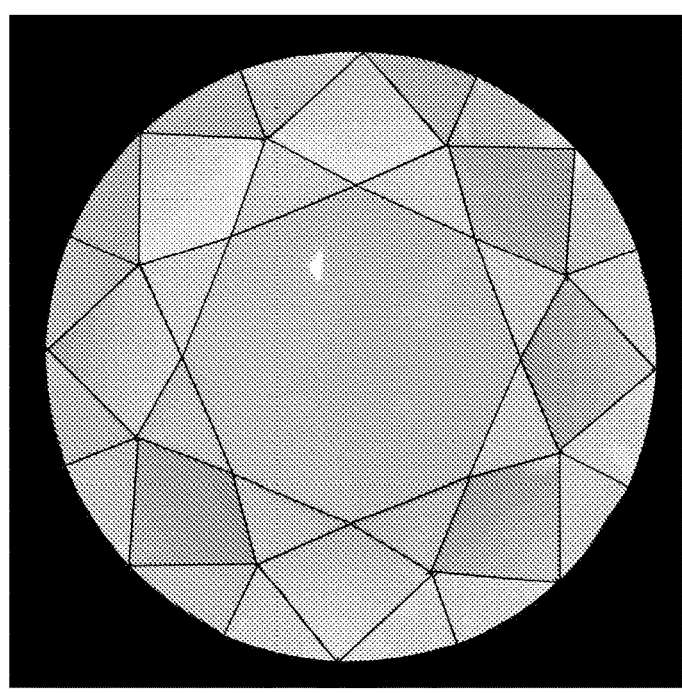
FIG.18A
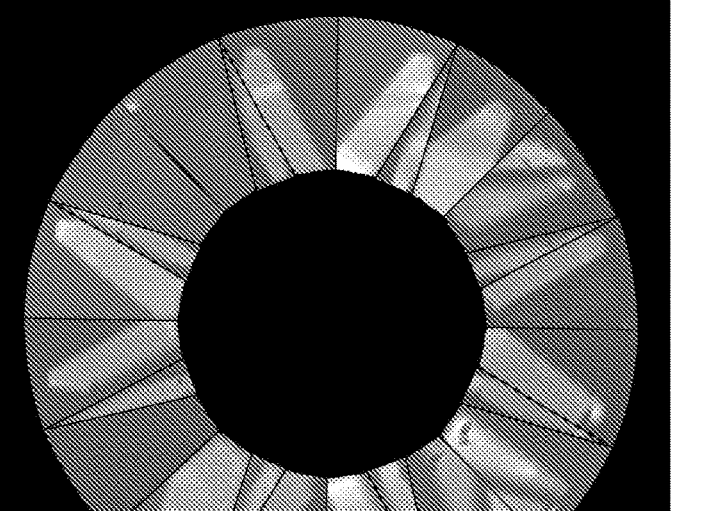
FIG.18B

*1900*

SYSTEM AND METHOD FOR GRADING CLARITY OF GEMSTONES

TECHNICAL FIELD

The present disclosure relates generally to field of grading a gemstone; and more specifically to systems and methods for grading clarity of a gemstone.

BACKGROUND

Gemstones are precious stones that are cut and polished pieces of mineral crystal. Usually, they are used for making jewellery. Gemstones vary in their quality. The quality of the gemstone is indicated by gemstone grading. Gemstone gradings are done according to their clarity, cut, colour and weight. Clarity is the presence or absence of any imperfections or inclusions. Traditionally, the gemstones are graded manually by skilled gemologists.

SUMMARY

An object of the present disclosure is to provide systems and methods for grading a gemstone.

According to one aspect, there is provided a system for grading a gemstone, the system comprising:
an image capturing device disposed to capture images along a line of sight;
a holder to support the gemstone thereon, the holder is adapted to be positioned to dispose the gemstone along the line of sight;
a manipulator arm having a first end and a second end, with the holder mounted at the second end thereon, wherein the manipulator arm is further configured to: rotate along a roll axis thereof, and allow for rotation of the holder along a pitch axis thereof;
an illumination sub-system comprising:
a direct illumination arrangement,
a dark-field illumination arrangement, and
a facet illumination arrangement; and
a controller arrangement configured to:
selectively control one or more illumination arrangements in the illumination sub-system to generate a plurality of illumination patterns for the gemstone,
selectively control the manipulator arm to position the holder with a gemstone thereon for a plurality of orientations of the gemstone in relation to the image capturing device,
selectively control the image capturing device to capture an image of each of the generated plurality of illumination patterns, each of the plurality of orientations and each of one or more depths of focus, and
process the captured images to grade the gemstone.

In some embodiments, the system is configured and operable to grade clarity of the gemstone with respect to one or more of the following: surface cleanliness, surface polish state and internal inclusions.

In some embodiments, the system comprises a mechanical aligner configured and operable to align the gemstone, while located on the holder, with respect to the image capturing device, such that a selected facet of the gemstone is perpendicular to the line of sight.

In some embodiments, the direct illumination arrangement comprises a collimated light source, and a light directing arrangement to carry a collimated light beam from the collimated light source to at least one facet of the gemstone.

In some embodiments, the light directing arrangement comprises a beam splitter cube and a movement mechanism configured to move the beam splitter cube into and out of the line of sight.

In some embodiments, the collimated light beam generated by the direct illumination arrangement is used for verifying alignment of the gemstone with respect to the image capturing device.

In some embodiments, the direct illumination arrangement comprises a light source array configured and operable to illuminate the gemstone with one or more specular and/or diffused light patterns, the image capturing device being configured to capture one or more respective images that are processed by the controller arrangement to generate a cosmetic view of the gemstone comprising one or more still images and/or one or more motion images obtained by combining two or more still images captured at different orientations of the gemstone.

In some embodiments, the facet illumination arrangement comprises an array of light sources, each of the light sources being individually operable by the controller arrangement to illuminate at least a portion of a single facet of the gemstone, the image capturing device being operable to capture an image of the at least portion of the single facet while illuminated.

In some embodiments, the image capturing device is adapted to capture an image of a QR-code pre-printed on a facet of the gemstone, the controller arrangement being configured to process the image of the QR-code to identify the gemstone.

In some embodiments, the image capturing device comprises an iris having an adjustable opening, the controller arrangement being configured and operable to generate a control signal for optimizing the opening of the iris based on image processing to thereby reduce gemstone internal reflections in the images.

In some embodiments, the system comprises a plurality of holders fitting a plurality of gemstones of different sizes, the controller arrangement being configured and operable to automatically detect the holder mounted on the manipulator arm by performing image processing to images captured by the image capturing device.

In some embodiments, the controller arrangement is configured to process a plurality of images of the gemstone captured in a plurality of orientations of the gemstone and merge the plurality of images to create a three-dimensional model of the gemstone.

In some embodiments, the controller arrangement is configured to:
control the image capturing device to capture respective images for a gemstone A and a gemstone B, for each of the generated plurality of illumination patterns, each of the plurality of orientations and each of the one or more depths of focus,
process the captured images to generate a grade A for the gemstone A and a grade B for the gemstone B, and
apply a comparison between the captured images and/or the grades A and B and generate a match score indicative of a match between the gemstones A and B.

According to another aspect, there is provided a method for grading a gemstone, the method comprising:
supporting the gemstone onto a holder, with the holder positioned along a line of sight of an image capturing device and a table facet of the gemstone is perpendicular to the line of sight;

selectively controlling one or more illumination arrangements to generate a plurality of illumination patterns for the gemstone;

selectively configuring the image capturing device to capture an image of each of the generated plurality of illumination patterns;

selectively tilting the holder at different angles with respect to the line of sight to obtain different orientations of the gemstone;

selectively configuring the image capturing device to capture images at different depths of focus of the gemstone at each of the obtained different orientations thereof; and processing the captured images to grade the gemstone.

In some embodiments, the one or more illumination arrangements comprise a dark-field illumination arrangement, wherein while the gemstone is illuminated by the dark-field illumination arrangement, one or more images are captured at each one of the following orientations of the gemstone: a table view with zero tilt angle, a tilted view with a second tilt angle between zero and 45 degrees, a girdle view with 90 degrees tilt angle, and a pavilion view with a third tilt angle between 90 and 135 degrees.

In some embodiments, for each of the table view, tilted view, girdle view and pavilion view, a plurality of images are captured at a respective plurality of depths of focus of the image capturing device along the line of sight.

In some embodiments, the processing of the captured images comprises determining clarity of the gemstone including existence of internal inclusions.

In some embodiments, the method comprises a step of determining autofocusing and registering gemstone 3D position, by:

a) calculating a gemstone two-dimensional image size in pixels, using a 3D model of the gemstone and system known parameters;

b) locating the gemstone in the image using the image size in pixels and system known parameters;

c) cropping the image to a calculated region of interest;

d) calculating an initial table focus height using the 3D model of the gemstone and the system parameters;

e) moving the image capturing device to the calculated initial table focus height;

f) determining table focus height by capturing an image at the initial table focus height;

g) determining the culet height position for the image capturing device using the table focus height and the 3D model;

h) capturing a culet height image from the culet height position;

i) determining the girdle height position for the image capturing device using the table focus height and the 3D model;

j) capturing a girdle height image from the girdle height position; and k) calculating and registering the 3D position of the gemstone by processing the images captured in the steps (f), (h) and (j).

In some embodiments, the one or more illumination arrangements comprise a facet illumination arrangement, the method comprising illuminating one or more facets of the gemstone with the facet illumination arrangement, capturing images by the image capturing device and processing the images to determine surface cleanliness of the one or more facets.

In some embodiments, the images are processed to determine a polish grade for the gemstone.

In some embodiments, the one or more illumination arrangements comprise a direct illumination arrangement, the direct illumination arrangement is selectively controlled to illuminate the gemstone with a collimated light beam which reflectance from the gemstone is detected and analysed to verify alignment of the gemstone with respect to the line of sight.

In some embodiments, the one or more illumination arrangements comprise a direct illumination arrangement, the direct illumination arrangement comprises a light source array configured and operable to illuminate the gemstone with one or more specular and/or diffused light patterns, the image capturing device being configured to capture one or more respective images that are processed to generate a cosmetic view of the gemstone comprising one or more still images and/or one or more motion images obtained by combining two or more still images captured at different orientations of the gemstone.

In some embodiments, the image capturing device is controllable to capture an image of a QR-code pre-printed on a facet of the gemstone, the image of the QR-code being processed in order to identify the gemstone.

In some embodiments, the image capturing device comprises an iris having an adjustable opening, the iris opening being controllable based on image processing to thereby reduce gemstone internal reflections in the captured images.

In some embodiments, the method comprises:

controlling the image capturing device to capture respective images for a gemstone A and a gemstone B, for each of the generated plurality of illumination patterns, each of the plurality of orientations and each of the one or more depths of focus, processing the captured images to generate a grade A for the gemstone A and a grade B for the gemstone B, and applying a comparison between the captured images and/or the grades A and B and generating a match score indicative of a match between the gemstones A and B.

Additional aspects, advantages, features and objects of the present disclosure will be made apparent from the drawings and the detailed description of the illustrative embodiments. The features of the present disclosure are susceptible to being combined in various combinations without departing from the scope of the present disclosure as defined by the claims.

BRIEF DESCRIPTION OF DRAWINGS

Embodiments of the present disclosure will now be described, by way of example only, with reference to the following diagrams wherein:

FIG. 4B is a flowchart listing steps of autofocusing and registering gemstone position in the system, in accordance with some embodiments of the present disclosure;

FIG. 10 is a flowchart listing steps of a method for the system, in accordance with some embodiments of the present disclosure;

FIG. 18A is a depiction of a merged crown reflection image of the gemstone, in accordance with some embodiments of the present disclosure;

FIG. 18B is a depiction of a merged pavilion reflection image of the gemstone, in accordance with some embodiments of the present disclosure.

DETAILED DESCRIPTION

The following detailed description illustrates non-limiting embodiments of the presently disclosed subject matter and non-limiting ways in which they can be implemented. Although some modes of carrying out the present disclosure have been disclosed, those skilled in the art would recognize that other embodiments for carrying out or practicing the presently disclosed subject matter are also possible.

The present disclosure relates to systems and methods for grading a gemstone. In some embodiments of the present disclosure, the systems and methods relate specifically to grading the clarity of a gemstone. There are a number of types of cut for the gemstone. A round brilliant cut (RBC) or modified RBC are of the most popular types of cut for diamonds. A diamond cut by RBC technique has three main parts: a crown, a girdle and a pavilion. Herein, the crown is a top portion of the faceted/polished diamond. The crown may be topped off by a table which may be a largest facet of the diamond. Typically, the crown includes eight stars, eight mains and sixteen "half" facets, apart from the table. The girdle may be a widest part of the diamond, and forms an outermost edge of the gemstone. The pavilion is located below the girdle and is in a shape of 'V'. Similar to the crown, the pavilion may be faceted, i.e. the pavilion may have polished flat surfaces. The pavilion, generally, includes eight mains and sixteen "half" facets. The cullet may be a facet cut at a bottom-most tip of the diamond. It may be understood that there may be a total of fifty-seven facets in the RBC cut diamond.

Figure 1:
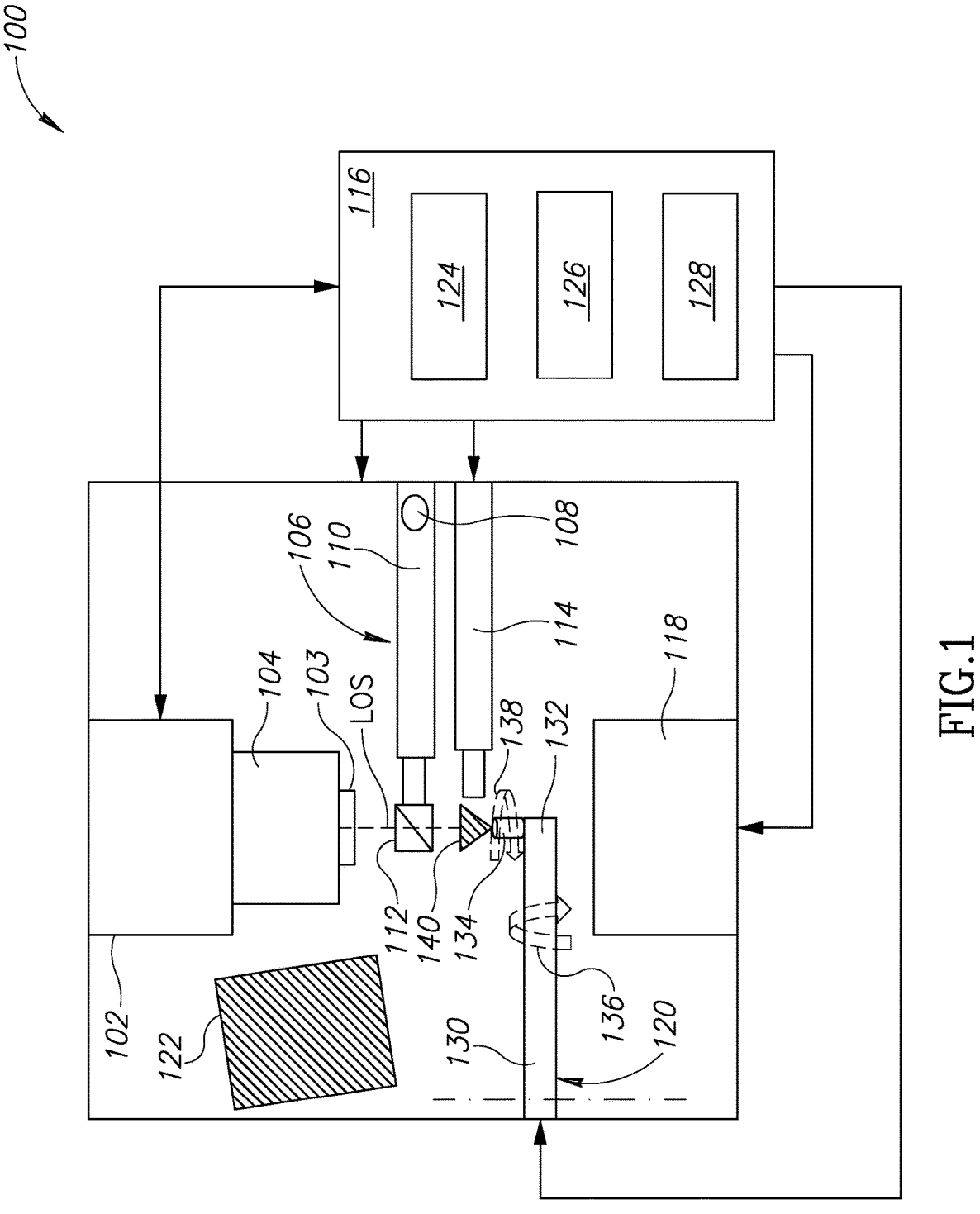
FIG. 1 is a schematic illustration of a system for grading a gemstone, in accordance with some embodiments of the present disclosure.

FIG. 1 is a schematic illustration of a system 100 for grading clarity of a gemstone 140, in accordance with some embodiments of the present disclosure. In some embodiments, the system 100 is utilized for grading a gemstone for colour and/or cut. In some embodiments, the system 100 is utilized to identify origin of a diamond being from a specific regional area and/or mine, i.e. to provide traceability for the diamond through the manufacturing and/or commercial stages. It is to be understood that while a plurality of components are illustrated in the FIG. 1, this should not be interpreted as all the components are necessarily included in the system, it could be that only some of the components are included while the others are optional.

As will be described herein below, the system 100 comprises at least the following: a gemstone holder for securely supporting the gemstone, one or more illumination arrangements for illuminating the gemstone, at least one image capturing device for taking images of the gemstone and a controller arrangement configured and operable to process/analyse the images and generate one or more outputs indicative of properties of the gemstone including a grading of the gemstone and/or a plot of a map of inclusions and/or other features of the gemstone.

In some embodiments, the system 100 comprises an image capturing device 102 having a macro-lens 104. The image capturing device 102 may be disposed to capture images along a line of sight LOS. The line of sight as used herein may mean the field of view of the image capturing device and may be extending along a straight, broken or curved line coinciding at least partially with the optical axis of the image capturing device. In some embodiments, the image capture device 102 includes an image capture actuator (see FIG. 2) for moving the image capturing device 102 up and down, which may be utilized for focusing purposes along the line of sight.

In some embodiments, the system 100 comprises illumination sub-systems comprising some or more of the following: a direct illumination arrangement 106, a dark-field illumination arrangement 118 and a facet illumination arrangement 122.

In some embodiments, the direct illumination arrangement 106 comprises a collimated light source 108, a movement mechanism 110 and a beam splitter cube 112.

In some embodiments, the system 100 comprises an aligner 114. In some embodiments, the system 100 comprises a manipulator arm 120. In some embodiments, the manipulator arm 120 has a first end 130 and a second end 132.

In some embodiments, the system 100 comprises a holder 134 mounted at the second end 132 and configured for supporting/holding the gemstone 140. In some embodiments, the holder 134 is adapted to be positioned to dispose the gemstone 140 along the line of sight of an image capturing device. In some embodiments, the holder 134 may be a depression or a circular cavity. In some embodiments, the holder 134 comprises a component (not shown) configured to generate a negative pressure therein, so as to securely hold the gemstone when placed thereon. In some embodiments, the negative pressure is generated by employing a vacuum pump. In some embodiments, the gemstone 140 is securely held by a vacuum so that the gemstone is sucked into the holder 134 and is held tightly. Thus, the negative pressure may prevent the gemstone from falling-off of holder 134. In some embodiments, the system 100 includes a plurality of replaceable holders for supporting various gemstone sizes. For example, a small holder for supporting a gemstone of 0.2-0.5 carat, a medium holder for supporting a gemstone of 0.4-1.5 carat and so on. In some embodiments, the system 100, e.g. the controller arrangement, is configured to automatically identify the installed holder, e.g. by means of image processing algorithms executed by the controller arrangement on images captured by the image capturing device. Further, the system may identify the gemstone under examination, also by means of image processing algorithms executed by the controller arrangement on images captured by the image capturing device (e.g. finding gemstone's diameter and height from different images at different orientations).

In some embodiments, the manipulator arm 120 is configured to be swivelled about the first end 130 thereof between a first position for placing a gemstone and a second position along the line of sight for grading the gemstone. In some embodiments, the manipulator arm 120 is configured to rotate along a roll axis 136 thereof to enable imaging the gemstone from different orientation angles. In some embodiments, the manipulator arm 120 is configured to allow for rotation of the holder 134 along a pitch axis 138 thereof to enable imaging the gemstone from different angles about the gemstone longitudinal axis (coinciding with the line of sight direction when the gemstone is aligned).

In some embodiments, the system includes a controller arrangement 116 that may comprise a controller 124, a processor 126 and a user interface 128. The controller arrangement 116 (e.g. a computer running a specified software/firmware) may be configured to selectively control one or more of the following: one or more illumination arrangements in the illumination sub-systems to generate a plurality of illumination patterns for the gemstone 140; the image capturing device 102 to capture an image of each of the generated plurality of illumination patterns; and the processor to process the captured images and generate at least one output indicative of the gemstone properties, including grading clarity in/of the gemstone 140.

In some embodiments, the image capturing device 102 is configured to capture a QR-Code embedded (printed, engraved, etched) previously on the gemstone, e.g. on a facet of the gemstone. The QR-Code can then be processed by the controller arrangement to extract the encoded data. The encoded data can be indicative of origin, history, properties of the gemstone, thus providing traceability of the diamond along the manufacturing/processing chain.

In some embodiments, the image capturing device 102 comprises an iris 103 having an adjustable opening. The controller arrangement is configured and operable to generate a control signal for optimizing the opening of the iris based on image processing to thereby reduce gemstone internal reflections in the images.

In some embodiments, the system 100 comprises a gemstone's authenticating/fingerprint determining arrangement (not specifically shown). The gemstone's authenticating/fingerprint determining arrangement comprises one or more light sources configured and operable to illuminate the gemstone with fluorescence exciting illumination (e.g., UV light of specific wavelengths) and a spectrometer for detecting the excited fluorescence in the gemstone. The authenticating/fingerprint determining arrangement may be used to authenticate that the gemstone/diamond is a natural stone not being grown in the lab. Type 1a diamond forms about 98% of natural diamonds and cannot be produced in the lab, e.g. using the CVD or HPHT techniques. The authenticating/fingerprint determining arrangement can detect the 1a diamond, using specific UV wavelength(s), thus enabling to recognize whether the gemstone is natural. Additionally, the authenticating/fingerprint determining arrangement may allow for color/fluorescence zoning detection, a phenomenon where there are specific areas within the gemstone that have different certain fluorescence properties, thus adding another parameter that can be used for traceability of the gemstone.

In some embodiments, the system 100 is configured and operable to measure and/or detect gemstone properties related to the polish state/parameter of the gemstone, and generate a polish grade thereof. Polish grading parameter refers to how well the gemstone is polished, and how clean its surface is (permanent features). For example, it may refer to existence, intensity and spread of scratches and/or burn marks (both can occur from the polishing/manufacturing process or other processes). By utilizing one or more of the illumination arrangements (e.g. the direct illumination and the dark-field illumination) for producing specific lighting scenarios/patterns and illuminating the gemstone from different orientations utilizing the manipulator arm, and utilizing the image capturing device to capture respective images of the gemstone, polish features can be extracted by the controller arrangement by processing the images, possibly employing AI algorithms, and a polish grade of the gemstone can be determined.

In some embodiments, the system is configured to apply measurements to a gemstone A and to a gemstone B, the controller arrangement being configured to process the images/collected data of both gemstones and compare between the gemstones A and B. In some embodiments, the controller arrangement is configured to generate a matching score between gemstones A and B as part of the grading process for the gemstones. In some embodiments, the data related to a gemstone A was previously obtained and saved in a memory (a storage medium such as a cloud or physical storage).

Accordingly, in some embodiments, the system is operated as follows: capturing images of the gemstone A and the gemstone B; analyzing the images for the gemstone A and the gemstone B; storing, in the storage medium, data indicative of the gemstone A and the gemstone B grading, based on the analyzed images; and comparing the stored data of the gemstone A and the gemstone B, and determining whether the stored data are a match and therefore whether a gemstone B is the same gemstone as a gemstone A that was sourced from a particular mine/source.

In some embodiments, where the stored data of gemstones A and B do not match, the controller arrangement is configured to calculate, based on the comparing, a matching score for one or more features, such as clarity and inclusions, in gemstone A and in gemstone B, the matching score being informative of a match between the features of gemstone A and gemstone B, and, the controller arrangement being configured to identify gemstone B as being the same or derived from gemstone A when the matching score meets a predefined matching criteria.

Figure 2:
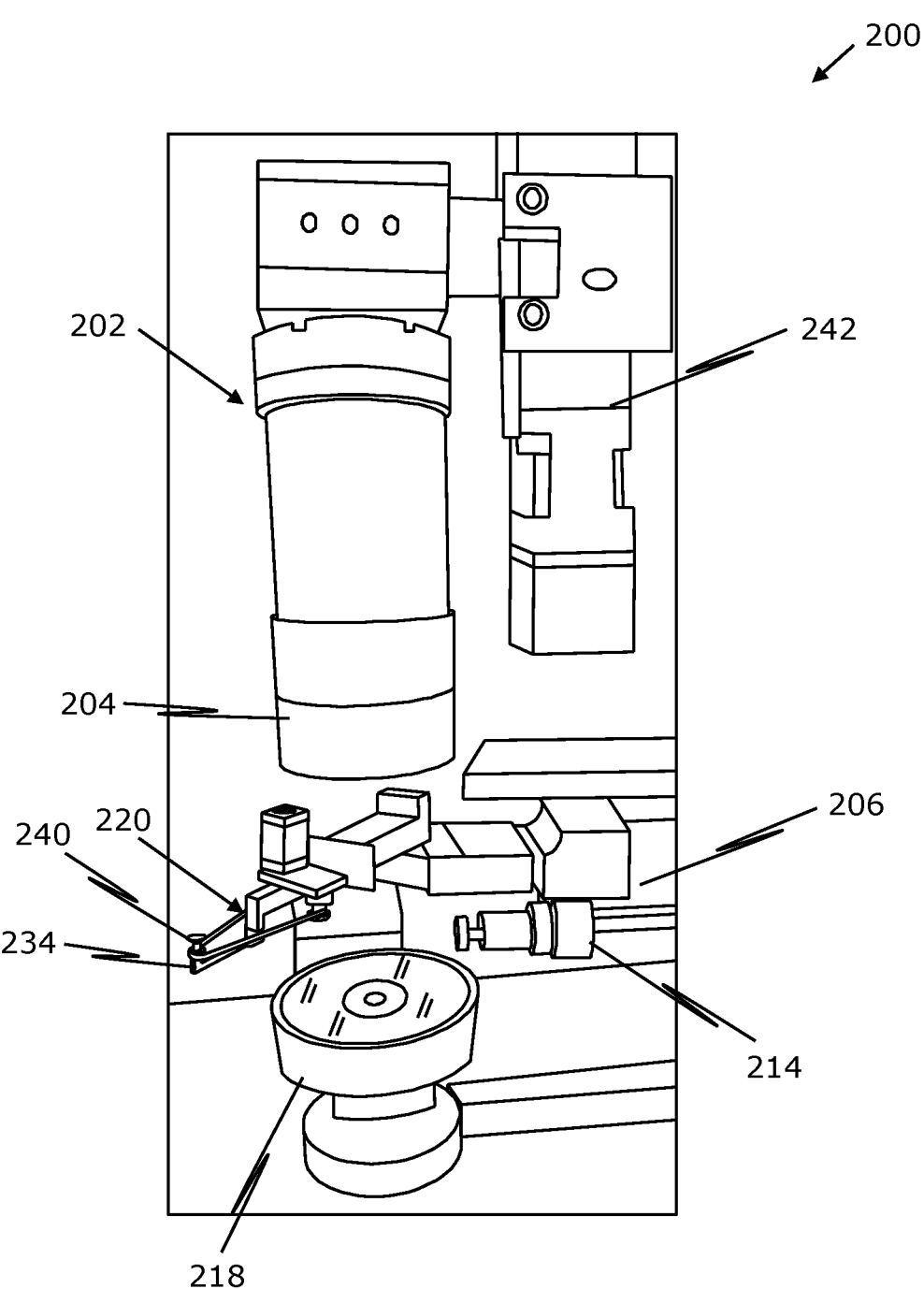
FIG. 2 is a perspective illustration of a system for grading the gemstone, in accordance with some embodiments of the present disclosure.

FIG. 2 is a perspective illustration of a system 200 for grading clarity of a gemstone 240, in accordance with some embodiments of the present disclosure. It is noted that, herein below reference numerals with addition of hundred multiplication(s) refer to same/similar components, possibly with added/modified features. For example, the number 202, like 102, refers to an image capturing device, and so on. In some embodiments, the system 200 comprises an image capturing device 202 having a macro-lens 204, a direct illumination arrangement 206, an aligner 214, a dark-field illumination arrangement 218, a manipulator arm 220 and an image capture actuator 242. In some embodiments, the manipulator arm 220 comprises a holder 234 that holds the gemstone 240. The image capture actuator 242 is configured to move the image capturing device 202 along the line of sight to adjust a depth of focus of the image capturing device 202 for capturing images of the gemstone 240.

Figure 3A:
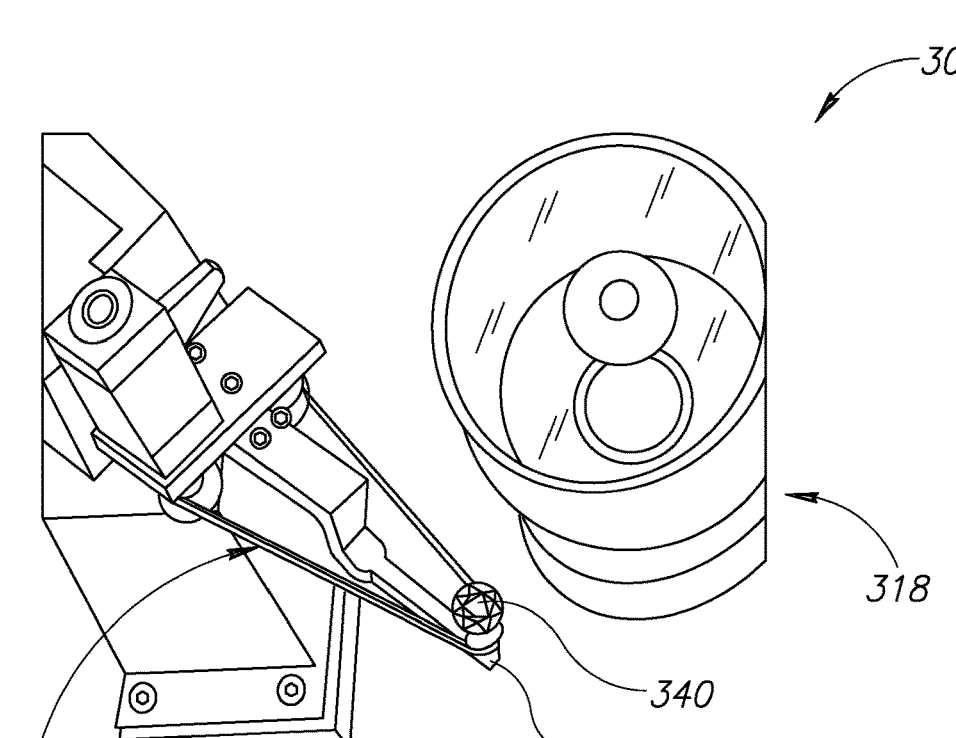
FIGS. 3A-3B are perspective illustrations of the system depicting movement of a manipulator arm therein, in accordance with some embodiments of the present disclosure.
Figure 3B:
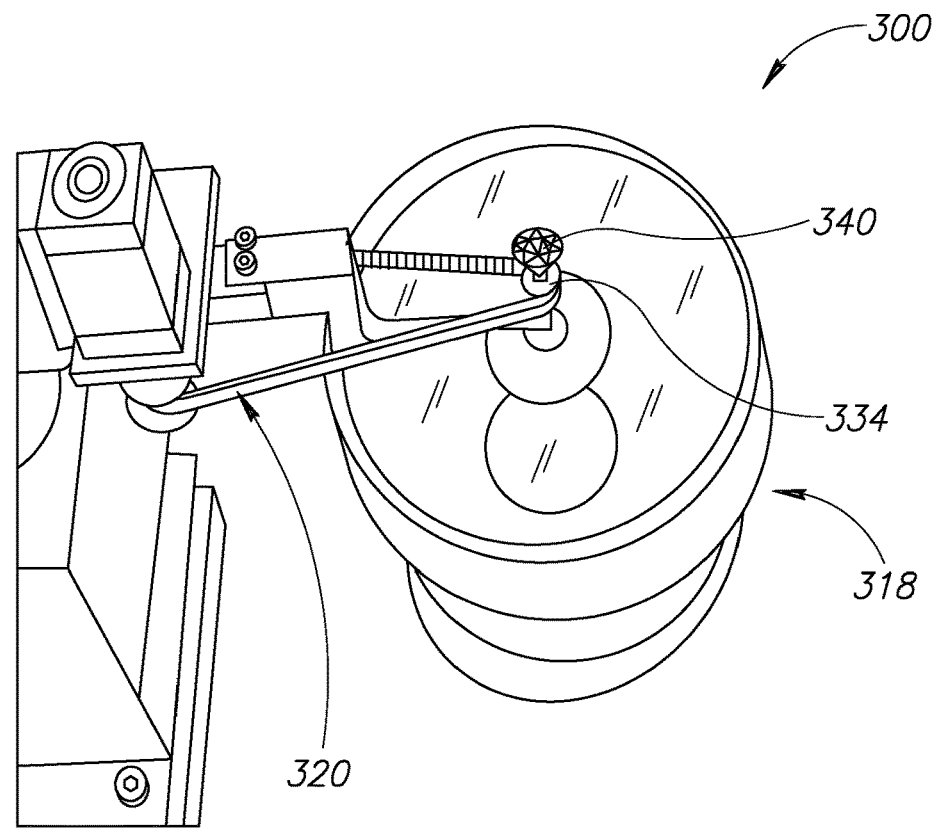

FIG. 3A is a perspective illustration of a system 300 comprising a manipulator arm 320 in the first position suitable for placing a gemstone on a holder 334, in accordance with some embodiments of the present disclosure. FIG. 3B is a perspective illustration of the system 300 with the manipulator arm 320 in the second position thereof, in accordance with some embodiments of the present disclosure. As shown, the holder 334 is mounted at the second end of the manipulator arm 320. The system 300 also comprises a dark-field illumination arrangement 318. In some embodiments, when the manipulator arm 320 is in the second position, the holder 334 is located above the dark-field illumination arrangement 318. In the second position of the manipulator arm, the gemstone 340 is, when positioned on the holder 334, in the line of light of the image capturing device (not shown, similar to the image capturing device 102 of FIG. 1).

In some embodiments, prior to placing a gemstone onto the holder 334, a gemstone "stone ID" is entered into the system on the user interface which acquires from a memory (local or in the cloud), a three-dimensional model (hereinafter 3D Model) of the gemstone, previously obtained for the gemstone, into a software of the system. In some embodiments, the 3D model was obtained in other systems configured to create a 3D model of a gemstone. In some embodiments, after entering the "stone ID", the gemstone is then placed on the holder 334 and the manipulator arm 320 is swivelled about the first end to the second position. In some embodiments, once the gemstone is placed, the manipulator arm 320 is automatically swivelled to the second position such that the gemstone is in the line of sight to the image capturing device.

In some embodiments, after the gemstone is placed and the manipulator arm is swivelled to the second position, an alignment procedure is followed by a combination of autofocus and registering stone position procedure(s). In some embodiments, after the gemstone is placed and the manipulator arm is swivelled to the second position, a combination of autofocus and registering stone position procedure(s) is/are followed by an alignment procedure. Any order or combination of the alignment procedure and the autofocus and registering stone position procedure(s) may be done to validate that the stone is in a correct position that is registered or understood by the system.

Figure 4A:
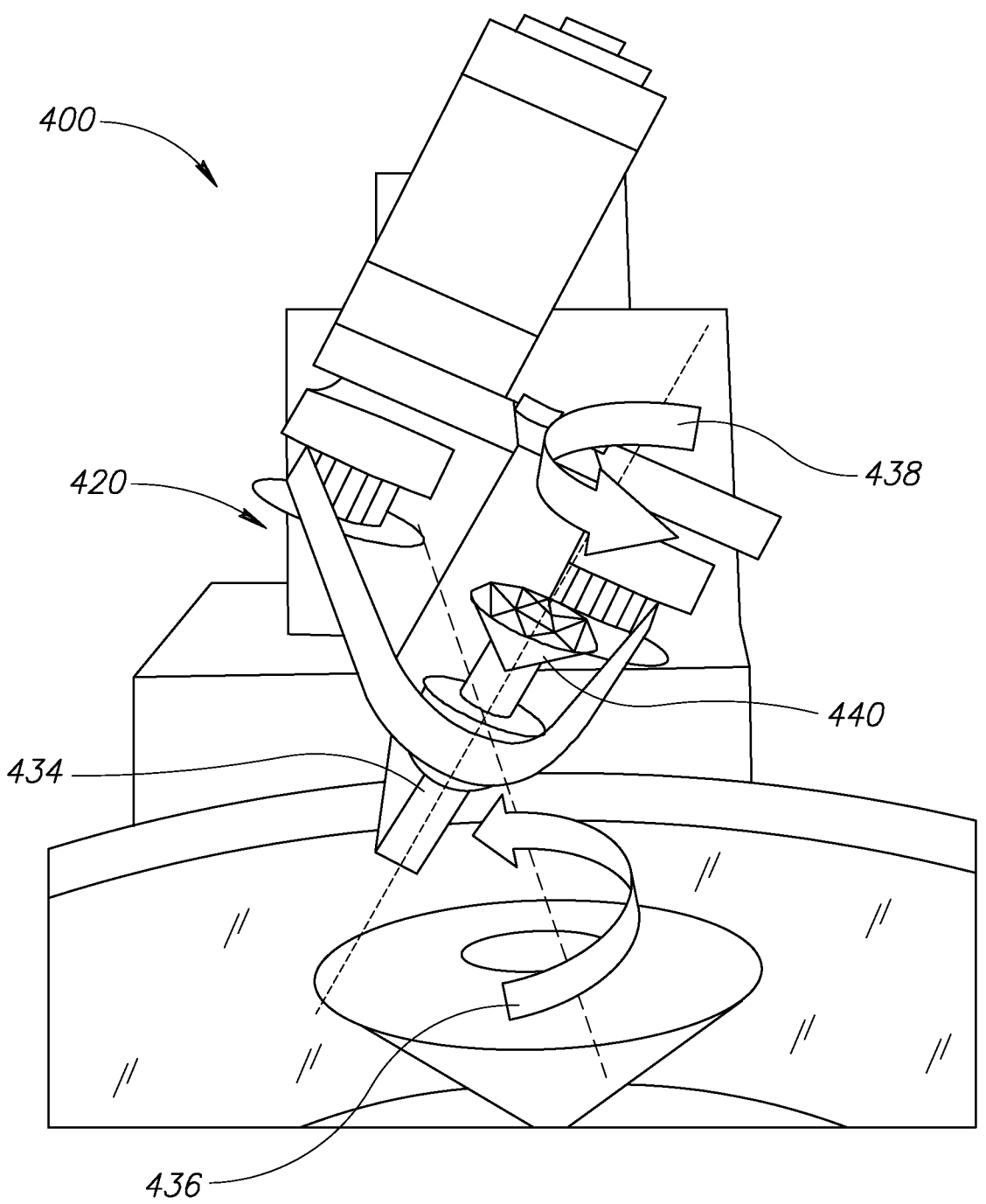
FIG. 4A is a perspective illustration of the system depicting possible operational movements of the manipulator arm, in accordance with some embodiments of the present disclosure.

FIG. 4A is a perspective illustration of the system 400 depicting possible operational movements of the manipulator arm 420 therein, in accordance with some embodiments of the present disclosure. The manipulator arm 420 may include the holder 434. The gemstone 440 is positioned on the holder 434. The manipulator arm 420 may be rotated along the pitch axis 438 and the roll axis 436, as shown.

FIG. 4B, by way of a specific example, is a detailed process flow of a method 4000 for autofocusing and registering gemstone position in accordance with some embodiments of the present disclosure. In some embodiments, the calculations in method 4000 are done in accordance with an image processing algorithm.

The method includes, at step 4002, calculating a gemstone two-dimensional image size in pixels, using the 3D model of the gemstone and system known parameters such as, a height of the holder etc.

The method includes, at step 4004, locating a gemstone in an image using the image size in pixels and system known parameters such as, a height of the holder etc.

The method includes, at step 4006, cropping the image to a calculated region of interest. The method includes, at step 4008, calculating an initial table focus height using the 3D model of the gemstone and the system parameters such as, a height of the holder etc.

The method includes, at step 4010, moving the image capturing device to the calculated initial table focus height.

The method includes, at step 4012, determining table focus height by capturing an image at the initial table focus height. After, analysing the captured image to determine proper focus and repeating; moving the image capturing device, capturing a picture, and analysing for proper focus until best focus is found.

The method includes, at step 4014, determining the culet height position for the image capturing device using the table focus height and the 3D model.

The method includes, at step 4016, capturing a culet image from the culet height position.

The method includes, at step 4018, determining the girdle height position for the image capturing device using the table focus height and the 3D model.

The method includes, at step 4020, capturing a girdle height image from the girdle height position.

The method includes, at step 4022, calculating using the data analysed from the images captured in the above steps of method 4000, the three-dimensional orientation of the gemstone.

Figure 5A:
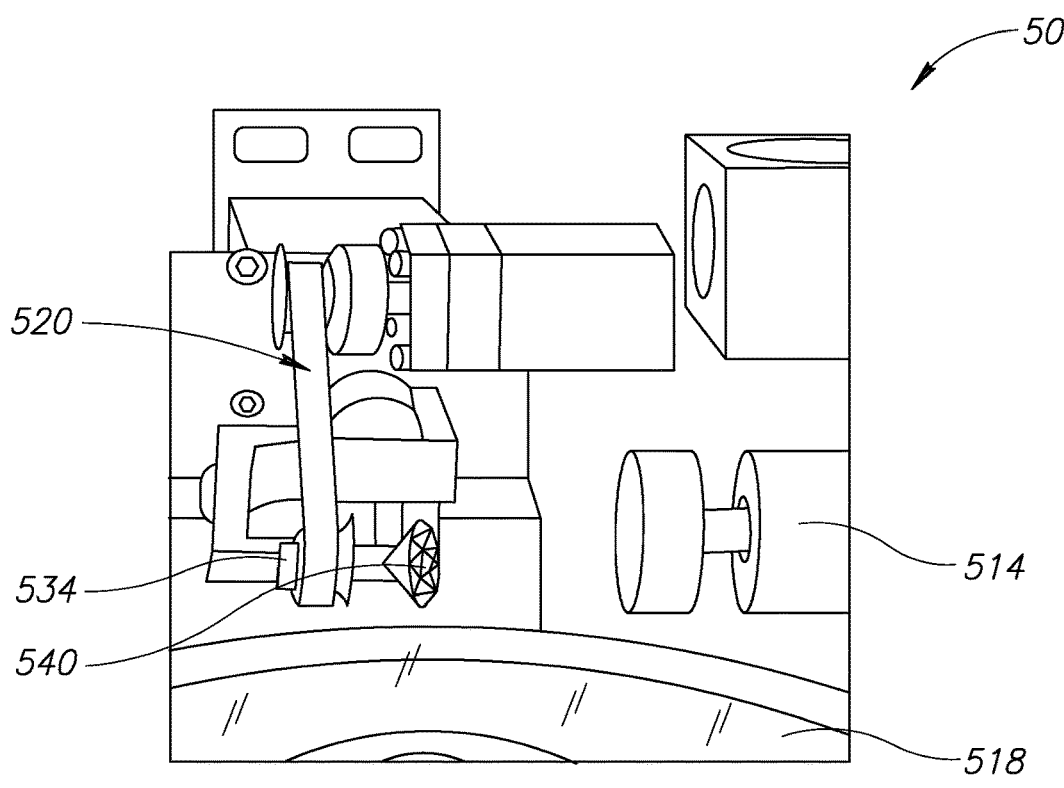
FIGS. 5A-5C are perspective illustrations of the system depicting operation of an aligner therein, in accordance with some embodiments of the present disclosure.
Figure 5B:
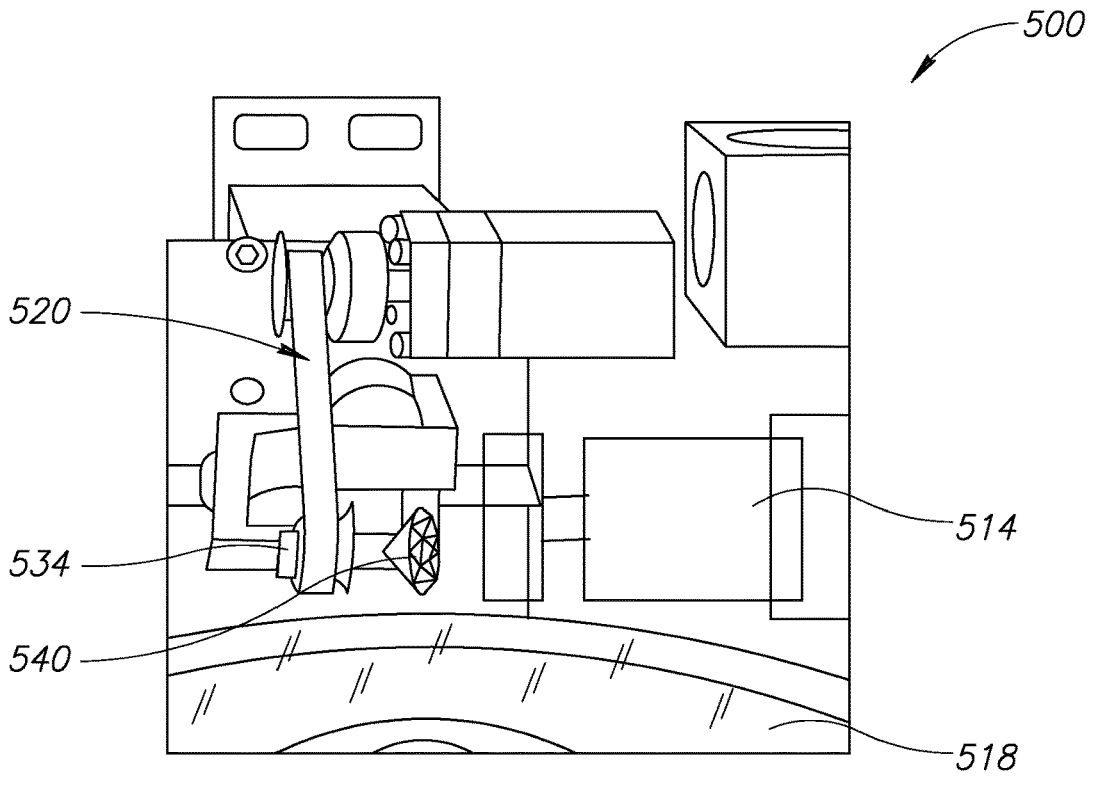
Figure 5C:
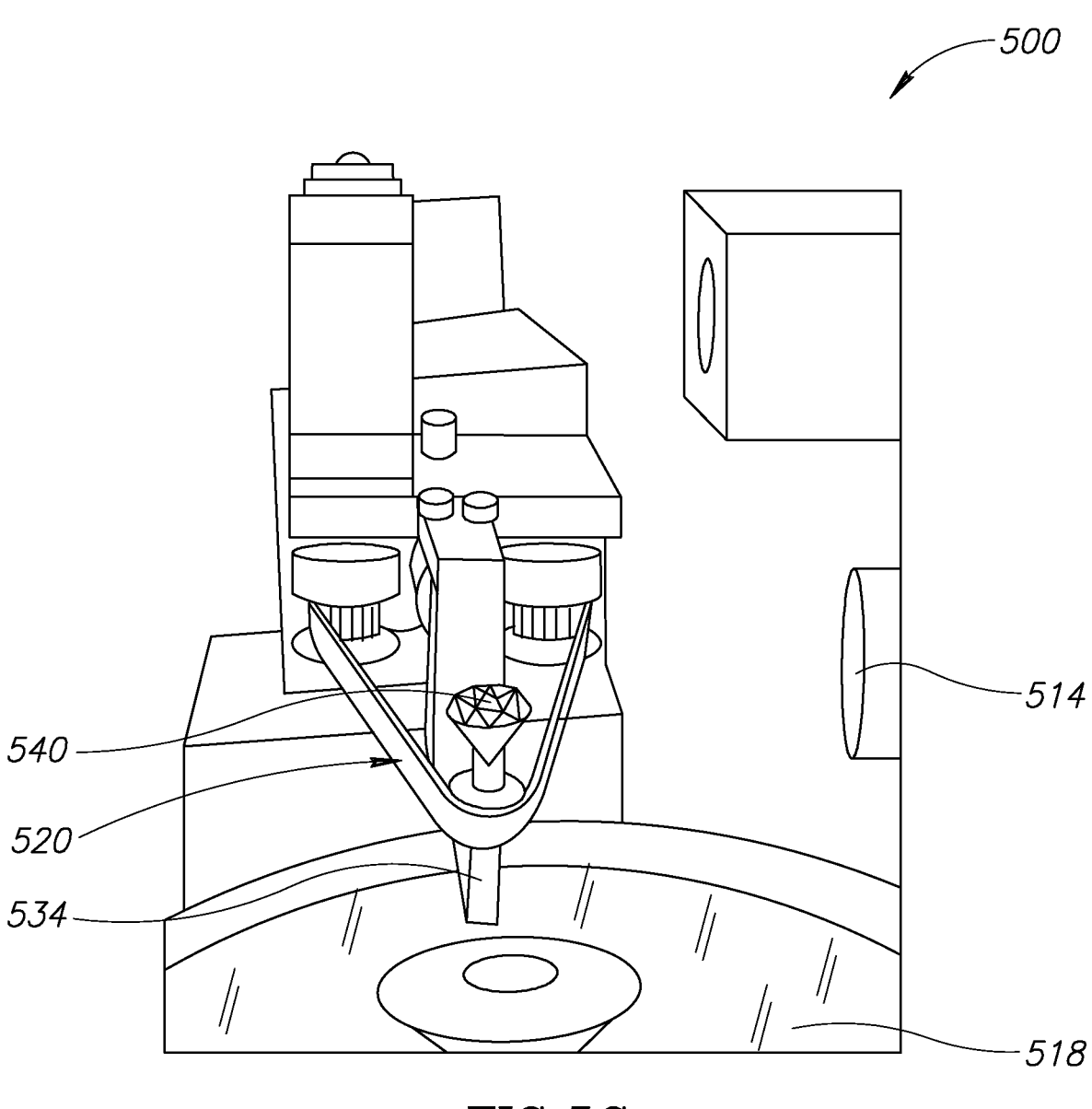

The method includes, at step 4024, registering the three-dimensional orientation of the gemstone in the system FIGS. 5A-5C are perspective illustrations of a system 500 depicting operation of a mechanical aligner 514, in accordance with some embodiments of the present disclosure. The mechanical aligner 514 aligns the gemstone such that the table of the gemstone is orthogonal to the line of sight of the image capturing device. The system 500 comprises the manipulator arm 520 and the dark field illumination arrangement 518. The manipulator arm 520 comprises the holder 534 on which the gemstone 540 is placed. The aligner 514 is configured to align the gemstone 540 with respect to the image capturing device when supported on the holder 534. In order to align the gemstone 540, the manipulator arm 520 may be tilted with a specific angle, e.g., by around 90 degrees, so that gemstone 540 and the aligner 514 face each other. Next, as shown in FIG. 5B, the aligner 514 may be brought closer to the gemstone 540, specifically the table of the gemstone. This may be continued till the aligner 514 touches the gemstone 540. The aligner 514 may be pressed against the gemstone 540 so that the gemstone is aligned. In some embodiments, the aligner 514 is actuated via a motor to press against the table of the gemstone. In some embodiments, the movement of the aligner 514 is stopped when a gemstone is sensed by sensors in said aligner and the aligner is pressed against the gemstone. Since the pavilion of the gemstone has basically a cone shape and is held against the holder 534 which may be a circular hole, pressing the gemstone table to the aligner 514 will cause the pavilion and cullet to slide into a correct position such that the gemstone table is aligned, i.e. the table's surface is orthogonal with the line of sight/imaging axis when the gemstone is moved back into the imaging position.

Referring to FIG. 5C, once the gemstone 540 is aligned, the aligner 514 may be retracted back, and the manipulator arm 520 may be tilted back by 90 degrees, so that the table of the gemstone 540 faces the image capturing device (like the image capturing device 102 of FIG. 1), i.e. the table is orthogonal to the line of sight of the image capturing device.

Figure 6A:
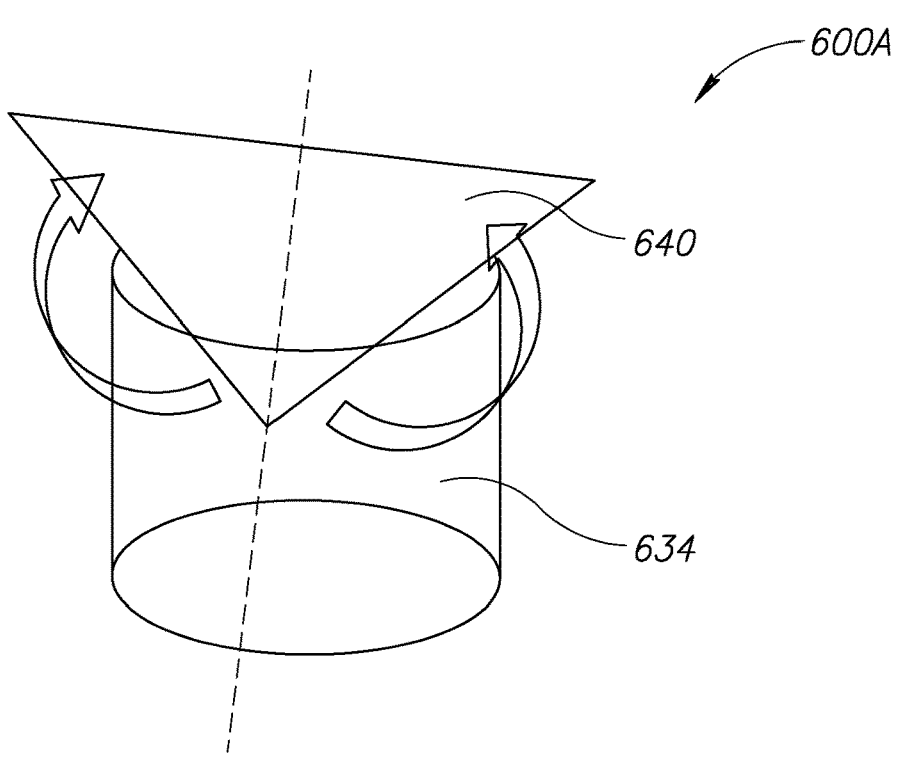
FIGS. 6A-6B are diagrammatic illustrations of mechanics of alignment of the gemstone, in accordance with some embodiments of the present disclosure.
Figure 6B:
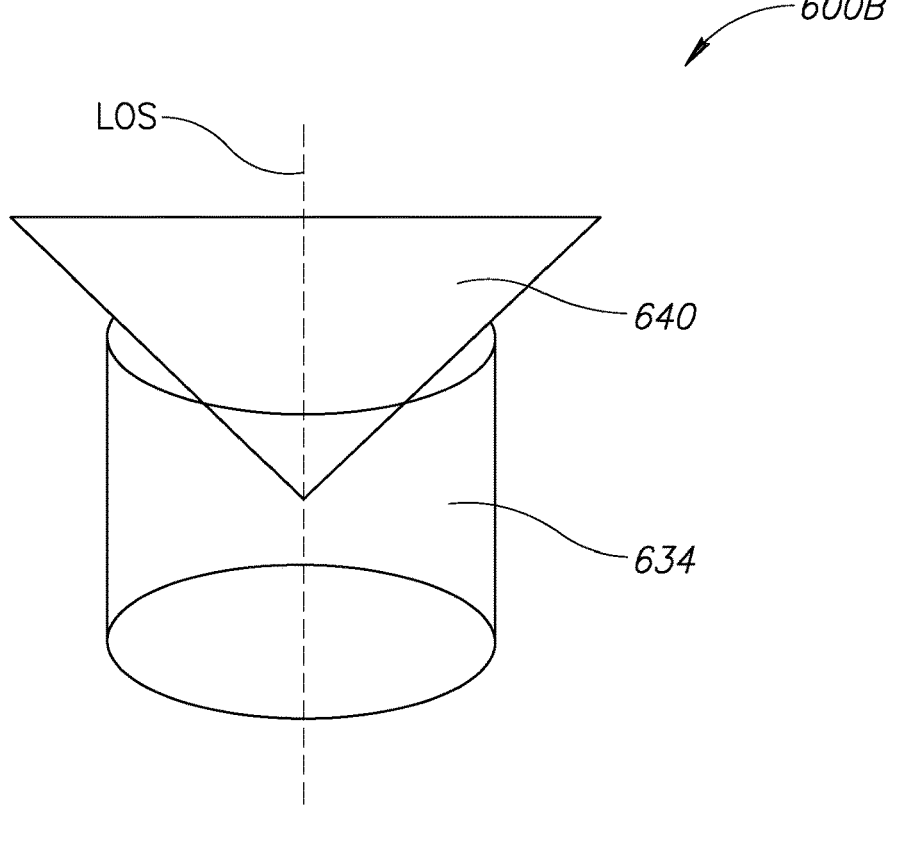

FIGS. 6A-6B are diagrammatic illustrations of mechanics 600A-600B of alignment of the gemstone 640 when positioned on the holder 634, in accordance with some embodiments of the present disclosure. In some embodiments, the holder 634 has a circular hole against which the gemstone 640 is held. Referring to FIG. 6A, the gemstone 640 may not be initially aligned in the holder 634, wherein alignment of the gemstone is correct when the table of the gemstone is orthogonal to the line of sight of the image capture device. In order to align the gemstone 640, the aligner may be pressed against a table of the gemstone 640 so that a cullet of the gemstone 640 slides into a right position. Moreover, only a circumference of a cone of the gemstone 640 touches the circular hole of the holder 634. Hence, the gemstone 640 may be aligned by pressing the aligner against the table of the gemstone 640. Referring, to FIG. 6B, the gemstone 640 is shown aligned within the holder 634 such that the surface of the table 648 is orthogonal to the line of sight/imaging axis LOS.

Figure 7:
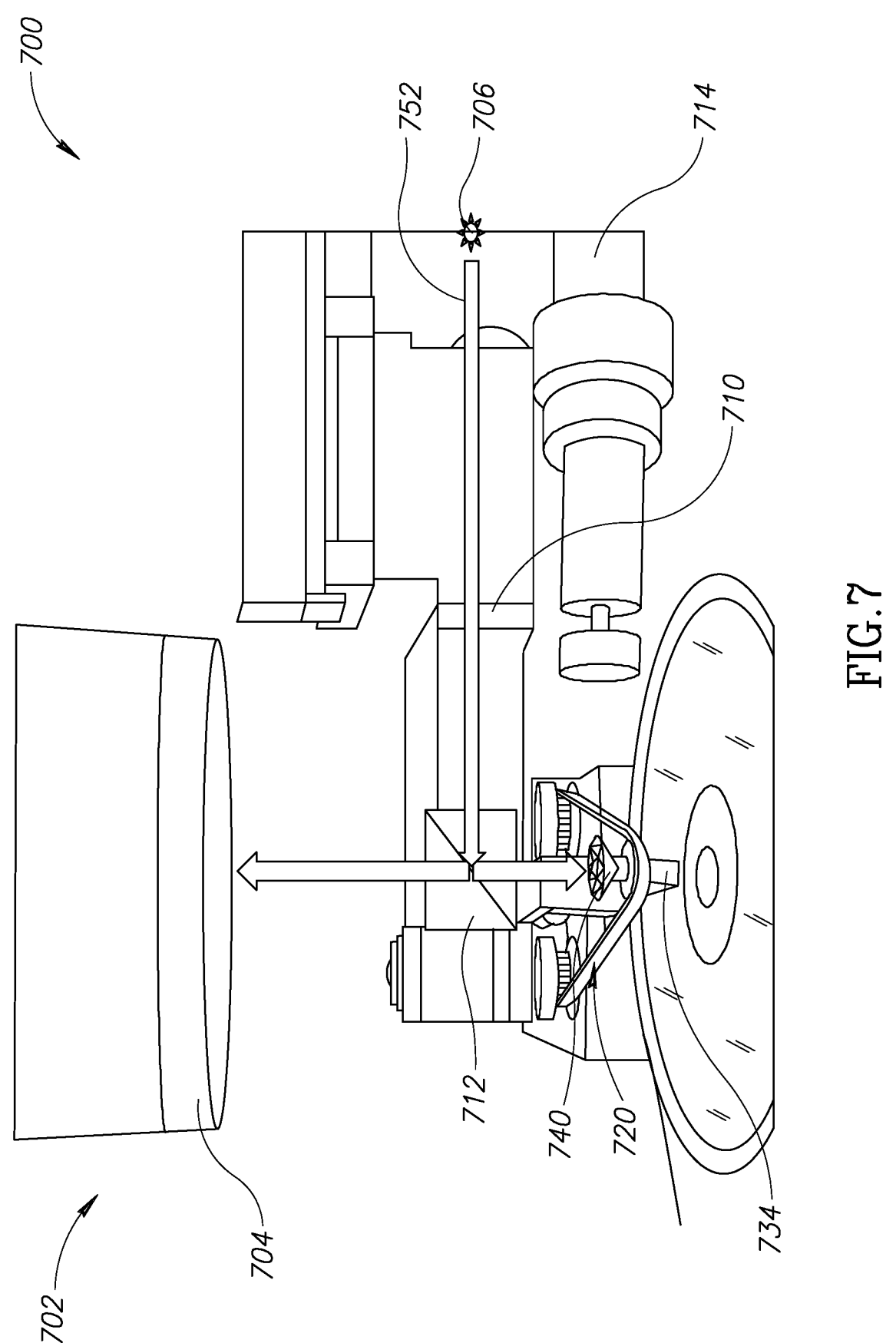
FIG. 7 is a perspective illustration of the system showing a direct illumination arrangement therein, in accordance with some embodiments of the present disclosure.

FIG. 7 is a perspective illustration of a system 700 comprising a direct illumination arrangement 706, in accordance with some embodiments of the present disclosure. The system 700 may comprise the image capturing device 702 having a macro-lens 704, the direct illumination arrangement 706 comprising a collimated light source 708, a movement mechanism 710 and a beam splitter cube 712 located at a first end of the movement mechanism 710, an aligner 714 and a manipulator arm 720. In some embodiments, the collimated light source is a light emitting diode that may generate collimated light having parallel light rays. In some embodiments, the collimated light source 708 is configured to generate collimated light directed therefrom to the beam splitter cube 712. In some embodiments, the controller arrangement (116 in FIG. 1) is configured to selectively switch the collimated light source 708 to control the collimated light source and control the movement mechanism 710 to selectively dispose the beam splitter cube 712 along the line of sight LOS, so as to direct the collimated light received towards the gemstone 740. The direct illumination arrangement 706 may allow to illuminate the gemstone 740 directly from the image capturing device's line of sight LOS. In some embodiments, the beam splitter cube 712 may be a device that splits an incoming beam of light into two beams of lights. The movement mechanism 710 may allow the beam splitter cube 712 to be disposed and removed from the line of sight LOS. A holder 734 may be mounted at the second end of the manipulator arm 720 and holds the gemstone 740 in the line of sight of the image capturing device 702. The controller arrangement (such as the controller arrangement 116 of FIG. 1) selectively switches the collimated light source 708 arranged at a second end of the movement mechanism 710 to generate a collimated light 752 directed therefrom to the beam splitter cube 712. The collimated light 752, upon striking the beam splitter cube 712 deviates by 90 degrees and hits the gemstone 740. The table of the gemstone may act like a mirror, so the collimated light hitting the table from the line of sight may be reflected off back, thus, creating a bright reflectance. The collimated light 752 is reflected from the table of the gemstone 740 and reaches the image capturing device 702 that, thereby, captures one or more images thereof.

In some embodiments, the direct illumination arrangement 706 comprises a light source array, e.g. arranged in a ring, configured and operable to illuminate the gemstone with one or more specular and/or diffused light patterns, the image capturing device 702 being configured to capture one or more respective images that are processed by the controller arrangement to generate a cosmetic view of the gemstone. The cosmetic view can include one or more still images, one or more motion (live) images obtained by combining two or more still images captured at different orientations of the gemstone.

In some embodiments, after the mechanical alignment step as illustrated in FIGS. 5A,5B,5C,6A and 6B above, an alignment verification and gemstone position registration process, as well as a 360 degrees alignment verification and rotation alignment process may be followed. First, the beam splitter cube may be inserted between the line of sight and the gemstone and the collimated light source activated. If the gemstone is aligned, that is, the table of the gemstone is perpendicular to the line of sight of the image capturing device, the table will reflect at least a portion of the collimated light received from the beam splitter cube. An algorithm based on the 3D model may be applied to verify whether the table is illuminated and thus the gemstone is aligned. Illuminating the table in this manner allows isolation of the table and enables the identification of the table and comparison to the gemstone 3D model.

In some embodiments, the 360 degrees alignment verification and rotation alignment process comprise: first, rotating the gemstone 360 degrees and capturing reflection images using direct illumination or the collimated light source every 45 degrees. Second, an algorithm may be utilized to verify the reflection light for each reflection image and analyse a gemstone rotation axis. Third, gemstone table reflection's edges may be detected and the gemstone may be rotated such that sides of the gemstone are in vertical position. This may be set as "0" rotation position.

In some embodiments, the gemstone position registration process includes defining a zero-facet of the gemstone by utilizing the 3D model. Since the gemstone's position and orientation is registered between the loaded 3D model and the images grabbed, and as it is known where each facet in the image is placed in the 3D model, the stone can be oriented to a specific orientation. A facet is determined as a zero-facet and the gemstone can be rotated so that zero-facet is always at a certain position (e.g., "12" o'clock of the image).

Figure 9:
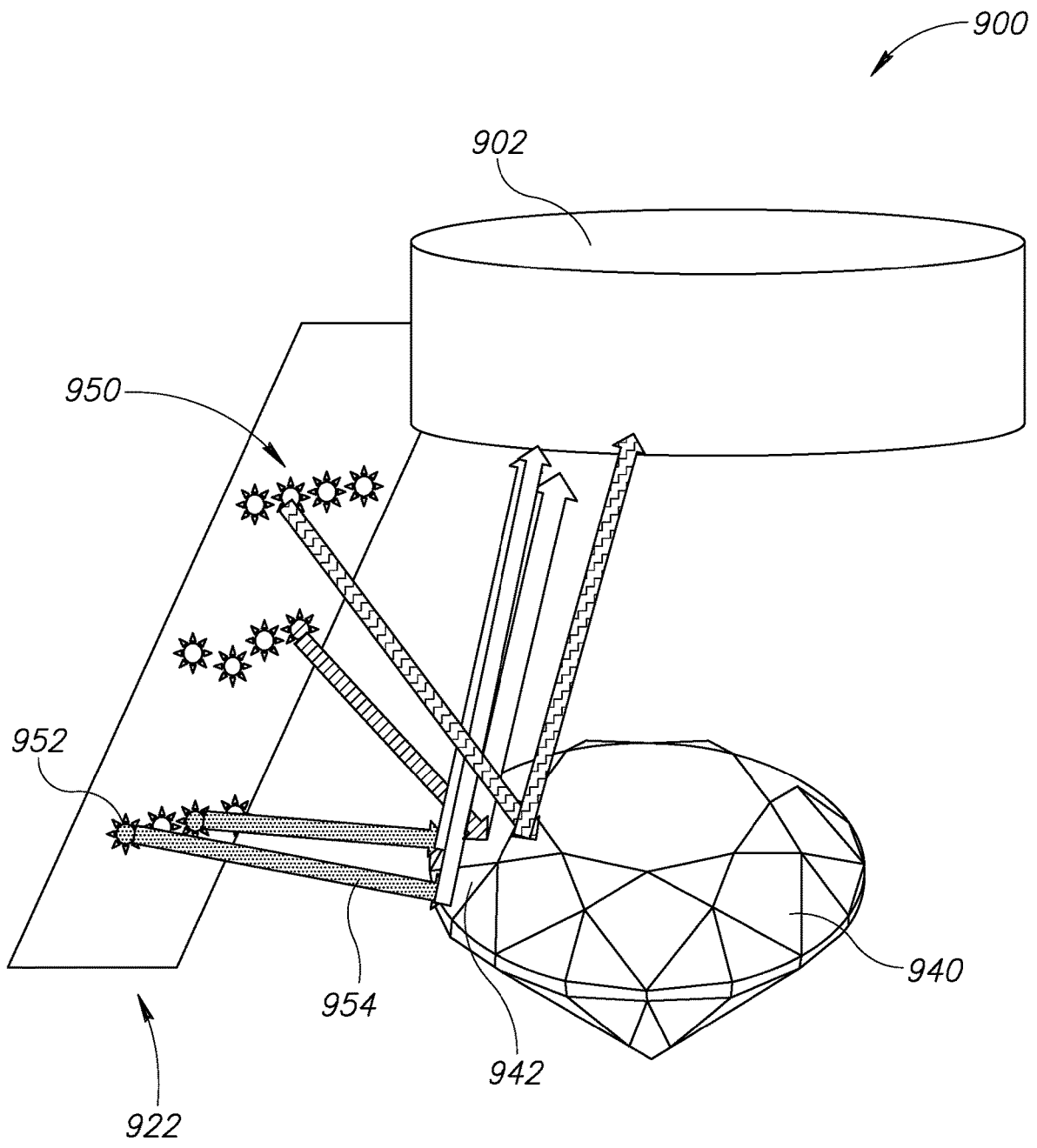
FIG. 9 is a schematic illustration of the system showing operation of a facet illumination arrangement therein, in accordance with some embodiments of the present disclosure.

In some embodiments, after the gemstone is aligned and its position registered as detailed above, an analysis of the gemstone's cleanliness is begun. In some embodiments, the table of the gemstone is checked for cleanliness by utilizing the system 900 illustrated in FIG. 9. In some embodiments, the system 900 comprises the facet illumination arrangement 922 and the image capturing device 902. The facet illumination arrangement 922 comprises the light array 950 containing a plurality of light sources 952. In some embodiments, the light sources of the light array comprise a plurality of light emitting diodes (LEDs). In some embodiments, each of the plurality of light sources is configured to generate a light beam, and each of the plurality of light sources is arranged to direct the generated light beam towards a different direction according to the facet of the gemstone that needs to be illuminated at any particular instant. The reflection may follow the basic principle of reflections which states that a ray of light hitting a reflective surface will reflect off at the same angle it contacted the surface. That is, an angle of reflection may be equal to an angle of incidence, wherein the one or more selected facets act like a mirror. Any dirt on the one or more selected facets may cause a shadow in the reflection, which could be found in the corresponding captured image, thus allowing to detect dirt.

The illuminated one or more selected facets may be then captured by the image capturing device. By way of specific example, a first light source or LED 952 of the plurality of light emitting diodes generates the light beam 954 to strike a half facet 942 of the gemstone 940. The light source or LEDs to be turned on may be decided by the controller arrangement to direct light therefrom to one or more of selected facets of the gemstone at a particular instant of time. In some embodiments, the gemstone while being lit under different illumination arrangements for image reflections off of different facets, the gemstone may also be manipulated by the manipulator arm toward the light sources as needed in order to change the depth of focus. Manipulation is determined by the 3D model and simulation. In this example, the different lighting patterns and the manipulation may be configured to identify the position and facet cleanliness of the gemstone. Moreover, the system may take images of the gemstone from various angles. This process utilizes a 3D model of the gemstone to selectively control the one or more illumination arrangements, and in this example the light array of the facet illumination arrangement.

In some embodiments, the facet illumination arrangement is configured to determine cleanliness of a gemstone and map the facet details of a gemstone. The facet details may include position of facets on the stone, size of the facets on the stone, or a combination thereof. In some embodiments, the illuminated one or more facets may be captured by the image capturing device. In some embodiments, the facet illumination is implemented as a controllable light source device allowing custom light pattern to be projected on the gemstone for allowing various illumination conditions including facet illumination.

The facets of the crown may be illuminated in groups of four. Herein, each group may comprise one star, one main facet and two half facets. Thus, a total of eight groups may be formed to capture the entire crown of the gemstone. Accordingly, based on the 3D model and the position, a light pattern may be generated to create the reflection from the facets. The gemstone may be rotated to capture images of all the facets of the crown.

In some embodiments, the process for generating a crown facet reflection image may be as follows. First, the gemstone may be rotated by 22.5 degrees from an initial position in order to have the "main" facets point towards the light array. This may be done for purposes derived from algorithm design, machine mechanical constraints and the likes. Second, the image capturing device may be focused to a crown reflection position that may be defined as halfway from the table to a girdle height and may be calculated by 3D model. Third, the required LED(s) may be turned on. Fourth, the image capturing device may be then configured to capture a first crown reflection image. Further, the provided third and fourth steps may be repeated seven times to capture seven crown reflection images. In some embodiments, once the crown reflection images and the pavilion reflection images are captured, the crown reflection images may be merged to create a merged crown reflection image and the pavilion reflection images may be merged to create a merged pavilion reflection image. The merged crown reflection image and the merged pavilion reflection image may be utilized to check a cleanliness of the gemstone. Herein, a dedicated algorithm may be utilized to verify the cleanliness of the gemstone and/or to notify a result to a user. Also, the algorithm may use these images to infer dirt in the captured images and utilize this data when for clarity/polish grade.

FIGS. 18A and 18B are respectively illustrations of a merged crown reflection image 1800A and a merged pavilion reflection image 1800B of the gemstone, in accordance with some embodiments of the present disclosure. The merged crown reflection image 1800A, or the merged pavilion reflection image 1800B, may be utilized for review and determining cleanliness of a gemstone.

In some embodiments, the systems and methods described herein can be utilized to improve the 3D model of a gemstone that has been obtained using another system. Sometimes, the 3D model has some inaccuracies with regard to the gemstone real measurements. The images captured using the systems and the methods described herein, from different orientations of the gemstone while illuminated with different illumination patterns (e.g., the facet illumination and the dark-field illumination arrangements), can be analysed and used to perform remodelling of the 3D model and increase the accuracy of the 3D model.

Returning now to FIG. 7, in some embodiments, the pavilion cleanliness is determined by the direct illumination arrangement (collimated light source) configured to generate the pavilion reflection images. By way of specific example, the facets of the pavilion are illuminated using the direct illumination arrangement. The gemstone may be tilted along a tilt axis so that the pavilion facet is reflecting. In some embodiment, the gemstone is rotated to the next facet which may be the main facet or the half facet. The gemstone may be tilted so that main facet of the pavilion is along the line of sight of the image capturing device. Then, the beam splitter cube may be disposed along the line of sight and the collimated light source may be turned on by means of the controller arrangement. In some embodiments, once the beam splitter cube is inserted to the line of sight, it stays there until a last pavilion reflected image is taken for last half facet. In some embodiments, the image capturing device may capture a first pavilion reflection image of a first main facet. Thereafter, the gemstone may be rotated by 45 degrees to capture a second reflection image of a next main facet. The last two steps may be repeated seven times until all the main facets are captured by the image capturing device.

Further, the gemstone may be rotated by 12.5 degrees so that a first half facet is along the line of sight. The image capturing device may capture the pavilion reflection image of the first half facet. Subsequently, the gemstone may be rotated by 22.5 degrees so that a second half facet is along the said line of sight. Herein, again, the last two steps may be repeated fifteen more times so that all the half facets are captured by the image capturing device. In this way all pavilion reflection images may be captured. In some embodiments, the gemstone while being lit under different illumination arrangements for image reflections off of different facets, the gemstone may also be manipulated by the manipulator arm toward the light sources as needed in order to change the depth of focus. Manipulation is determined by the 3D model and simulation. In this example, the different lighting patterns and the manipulation may be configured to identify gemstone structure/model matching, find the position and facet cleanliness of the gemstone. Moreover, the system and the method may take images of the gemstone from various angles.

In some embodiments, once cleanliness is analysed and thus determined, a clarity grading process is begun as illustrated in FIGS. 8A-C, 14-17.

Figure 8A:
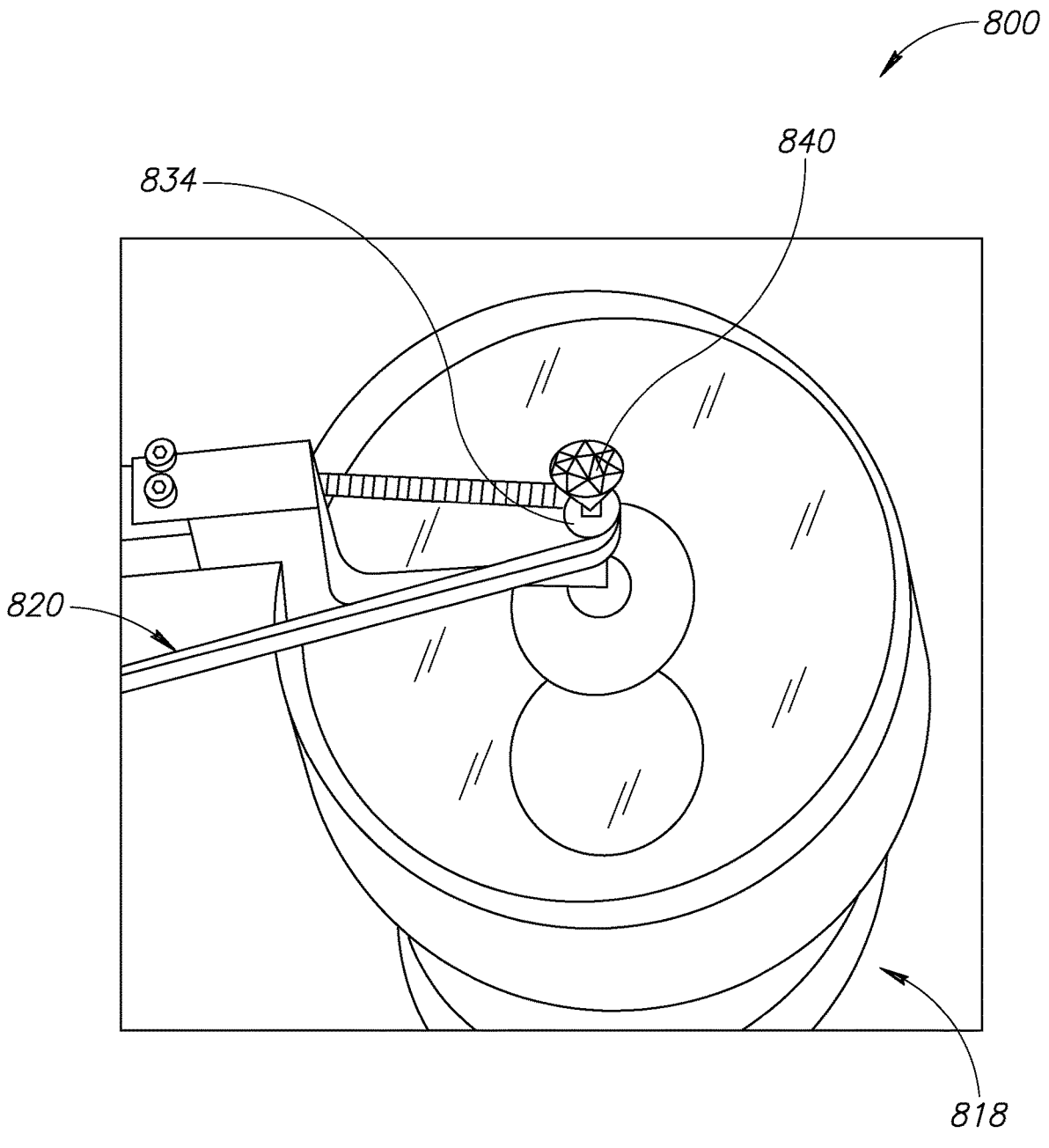
FIG. 8A is a partial perspective illustration of the system showing a dark-field illumination arrangement therein, in accordance with some embodiments of the present disclosure.
Figure 8B:
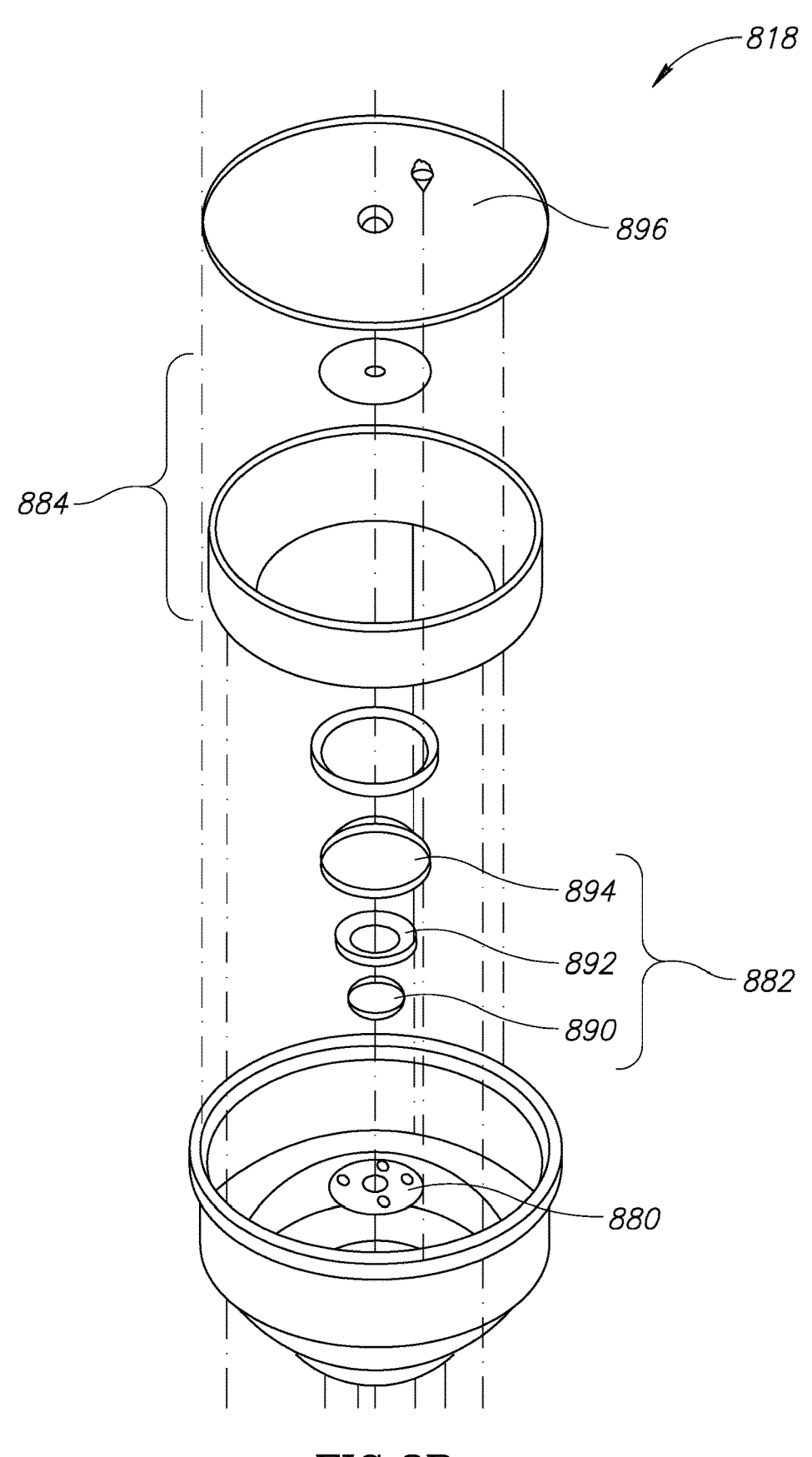
FIG. 8B is an exploded illustration of the dark-field illumination arrangement, in accordance with some embodiments of the present disclosure.

FIG. 8A is a perspective illustration of a system 800 implementing a dark-field illumination arrangement 818, in accordance with some embodiments of the present disclosure. In some embodiments of the system, the dark-field illumination arrangement is utilized to determine clarity of the gemstone. In the system 800, a manipulator arm 820 is in a second position thereof and a gemstone 840 is positioned on a holder 834 of the manipulator arm 820, which is placed on the top of the dark-field illumination arrangement 818. FIG. 8B is an exploded illustration of the dark-field illumination arrangement 818, in accordance with some embodiments of the present disclosure. The dark-field illumination arrangement 818 comprises a light source 880, a light collecting optics 882 and a spot forming optics 884. The light source 880 may comprise at least one light emitting diode (LED). In some embodiments, the light source in the dark-field illumination arrangement may include two light sources of different colours (wavelengths), and these two light sources may be two LEDs. In some embodiments, the light collecting optics 882 comprising a first light concentering lens 890, a second light concentering lens 892 and a third light concentering lens 894, arranged to receive the light from the light source 880 and configured to concentrate the light. The spot forming optics 884 may comprise a reflective cone arranged to receive the concentrated light and configured to reflect the concentrated light. The spot forming optics 884 also may comprise one or more parabolic mirrors arranged to receive the concentrated light reflected from the reflective cone and configured to further reflect the light towards the gemstone 840 arranged on the holder 834. The dark-field illumination arrangement 818 may further comprise a glass covering 896 as a cover therefor.

Figure 8C:
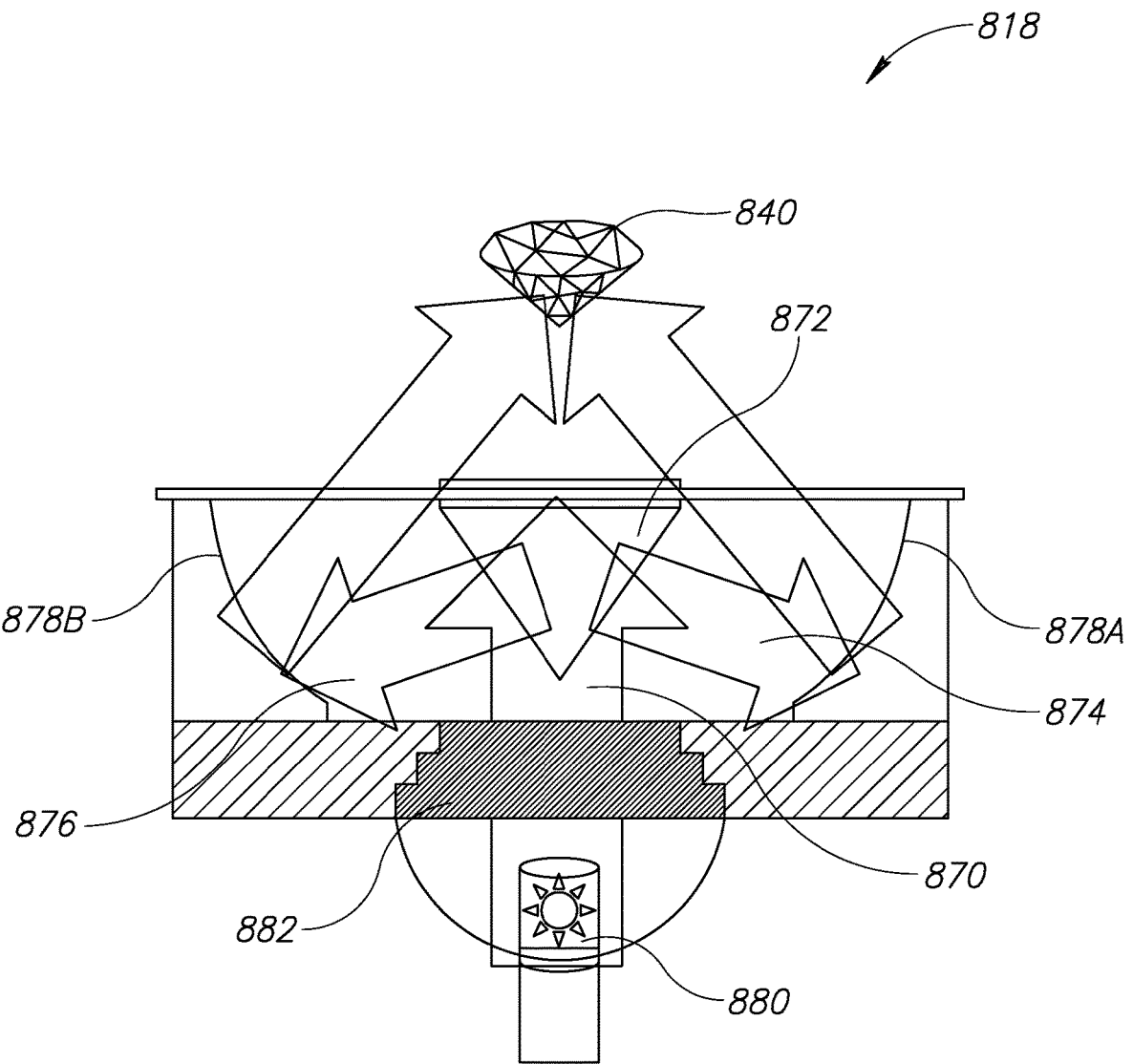
FIG. 8C is a schematic illustration of the dark-field illumination arrangement, in accordance with some embodiments of the present disclosure.

FIG. 8C is a schematic illustration of the dark-field illumination arrangement 818, in accordance with some embodiments of the present disclosure. As depicted, in the dark-field illumination arrangement 818, the light source 880 generates the light, which may be concentrated by the light collecting optics 882. The concentrated light 870 may be reflected from the reflective cone 872. The reflected concentrated light 874, 876 may be further reflected from a first parabolic mirror 878A and a second parabolic mirror 878B to strike the gemstone 840.

The process of grading clarity of a gemstone may include capturing images under a dark field illumination, thus scanning the gemstone similar to a "CT scan" of the gemstone that allows inclusions such as, edges, defects and scratches in the gemstone to be better seen. In some embodiments, the gemstone is scanned under this dark field illumination, in a table view, a tilted view, a girdle view and a pavilion view.

Figure 14:
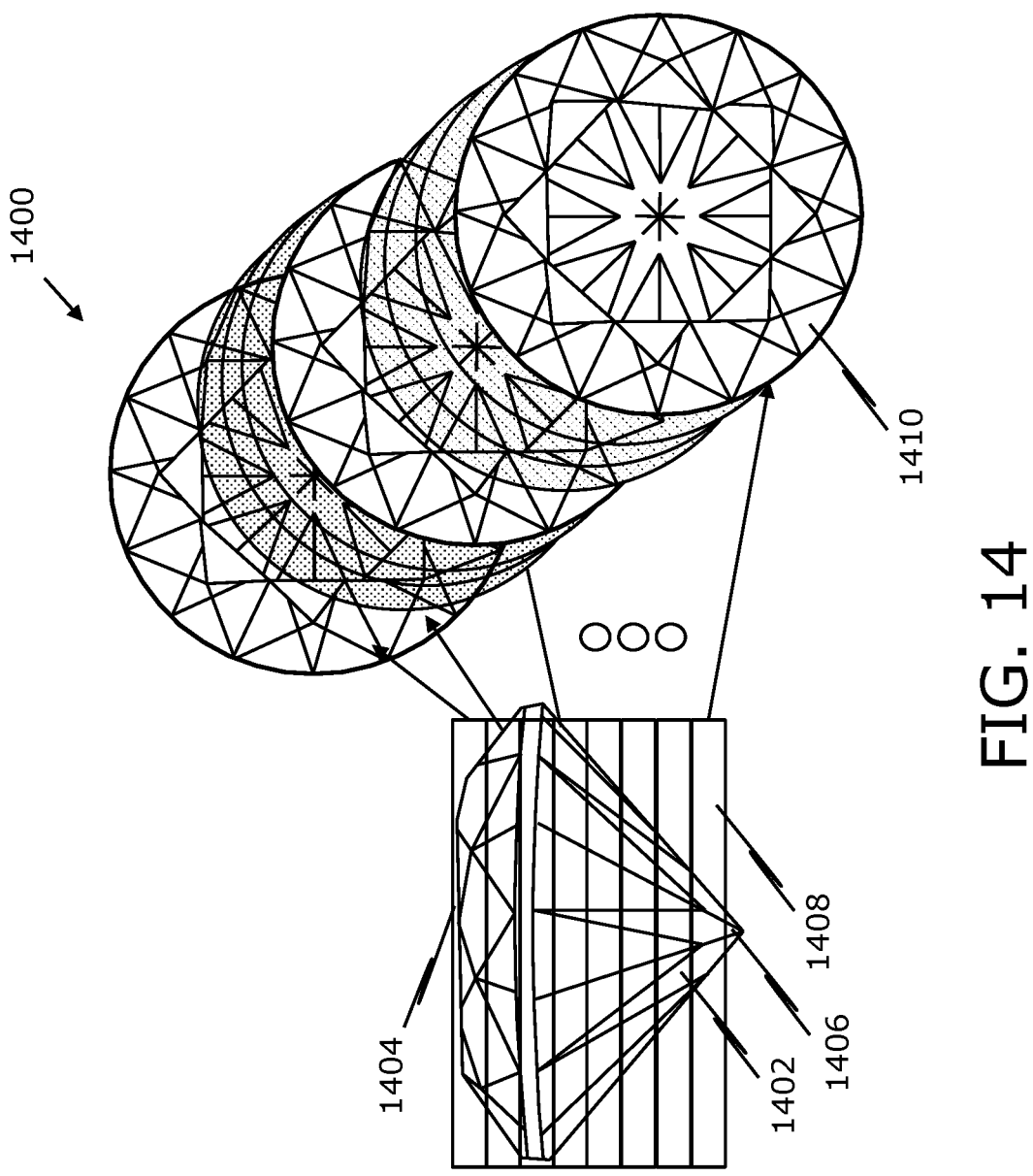
FIG. 14 is an illustration of a process for scanning the gemstone to obtain a table view thereof, in accordance with some embodiments of the present disclosure.

FIG. 14 is an illustration of a process for scanning a gemstone 1402, using the dark-field illumination arrangement, to obtain a table view 1400 thereof, in accordance with some embodiments of the present disclosure. In some embodiments, the gemstone 1402 is scanned in steps with a determined step size through all its depth from the table 1404 to the cullet 1406. A number of steps, say 'X', may be fixed and a step size may be calculated from the 3D model. These steps may be repeated X number of times to obtain the table view from table to cullet. The table view 1400 comprises a first set of images comprising one image for each depth plane of the gemstone 1402. For example, for the depth plane 1408, a first image 1410 is captured. The process of rotating the gemstone 1402 and capturing image may be repeated until entire gemstone 1402 is captured. The captured images are merged to obtain the table view 1400 of the gemstone 1402.

Figure 15:
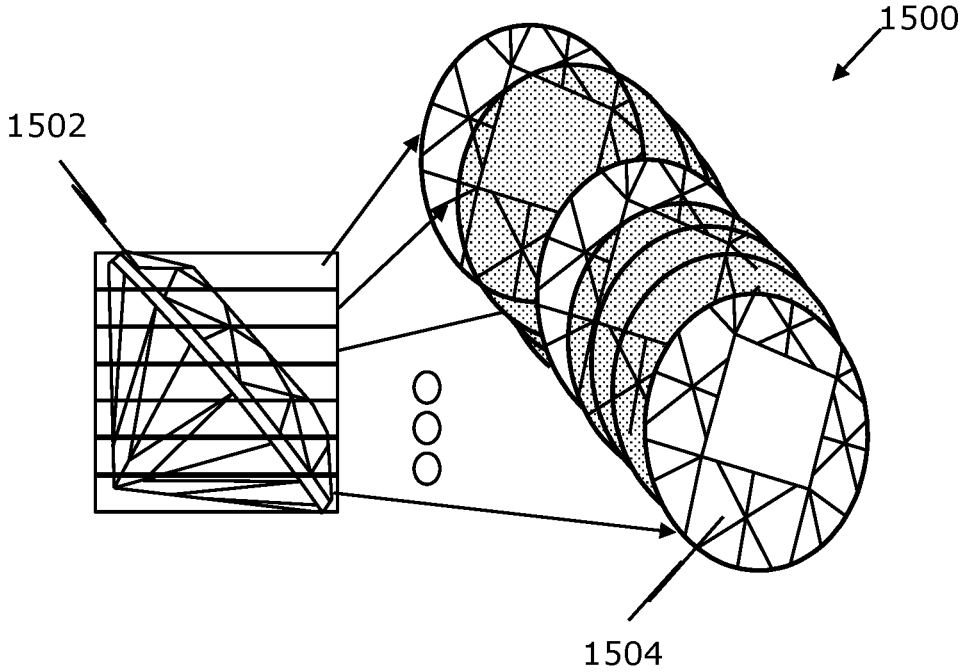
FIG. 15 is an illustration of a process for scanning the gemstone to obtain a tilted view thereof, in accordance with some embodiments of the present disclosure.

FIG. 15 is an illustration of a process for scanning a gemstone 1502, using the dark-field illumination arrangement, to obtain a tilted view 1500 thereof, in accordance with some embodiments of the present disclosure. In some embodiments, the gemstone 1502 is tilted 30 degrees, by tilting the manipulator arm along the roll axis. The gemstone tilt reference may be from "0 position". In some embodiments, in order to scan the tilted view, a main facet height which may be the highest point in the gemstone may be calculated by using the registration of the gemstone and the 3D model. The gemstone may be scanned down the entire height from the main facet to the cullet with the step size which may be fixed and may depend on the depth of field of the image capturing device and the system parameters and may be calculated from the 3D model. In some embodiment, the next step in the process is to position the image capturing device at the main focus height. A first image 1504 may be captured at this position. Next, the tilted gemstone 1502 may be rotated (around the rotation axis of the diamond) by 45 degrees and a second image may be captured. The process of rotating the tilted gemstone 1502 and capturing image may be repeated until entire tilted gemstone 1502 is captured. The tilted view 1500 may comprise a second set of images where one image is for one rotation of the tilted gemstone 1502. It may be observed from the FIG. 15 that the tilted gemstone 1502 is sliced into plurality of depth planes. Herein, each slice represents one 45 degrees rotation of the tilted gemstone 1502. The captured images are merged to obtain the tilted view 1500 of the gemstone 1502.

Figure 16:
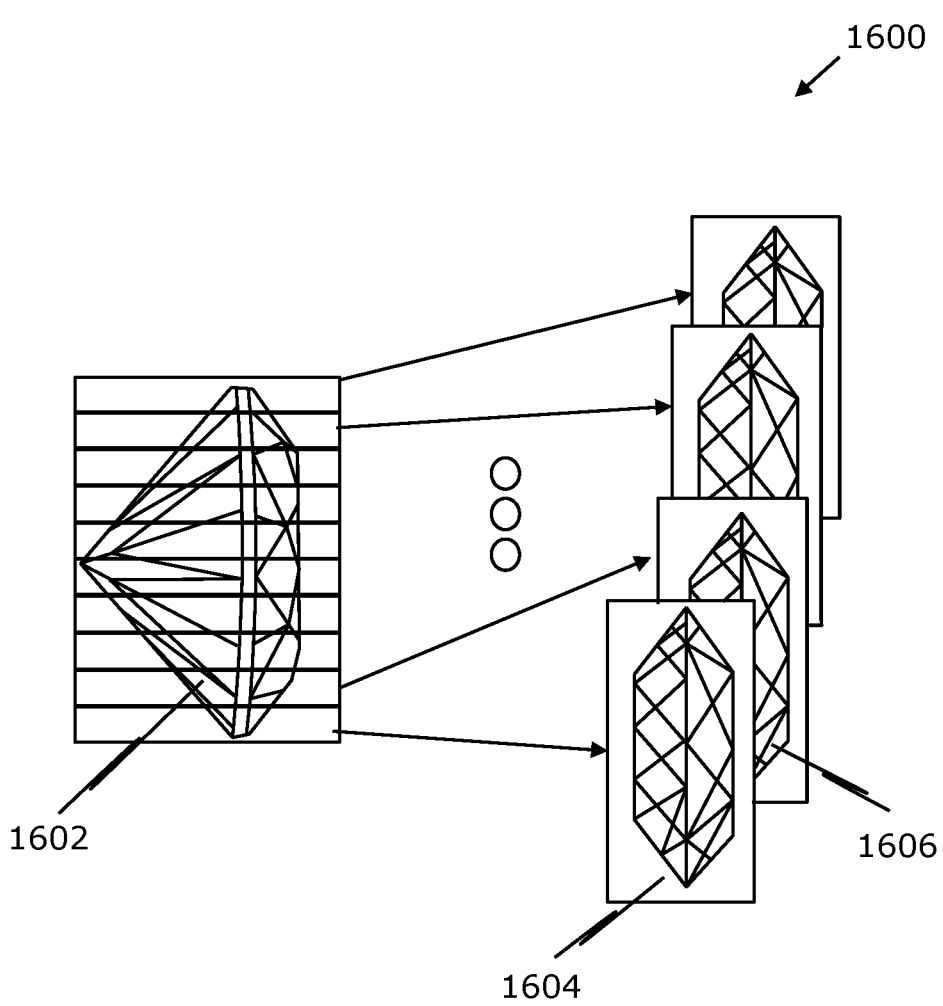
FIG. 16 is an illustration of a process for scanning the gemstone to obtain a girdle view thereof, in accordance with some embodiments of the present disclosure.

FIG. 16 is an illustration of a process for scanning a gemstone 1602, using dark-filed illumination arrangement, to obtain a girdle view 1600 thereof, in accordance with some embodiments of the present disclosure. In order to obtain the girdle view 1600, the gemstone 1602 may be tilted by 90 degrees along the roll axis of the manipulator arm utilizing the manipulator arm. The gemstone tilt reference may be from "0 position." In order to scan the girdle view, the highest point in the gemstone at this orientation may be calculated by using the gemstone registration and the 3D model of the gemstone. The girdle view 1600 is formed by capturing a third set of images, where one image is for one rotation of the gemstone. In some embodiments, the image capturing device may be positioned at a girdle focus height, and the autofocus process is applied to find best focus position for the image capturing device, then the image capturing device is configured to capture a third set of images. The number of images in the third set of images may be calculated using the 3D model. A first image 1604 may be captured and then the gemstone 1602 may be rotated (around the rotation axis of the diamond) by 45 degrees and a second image 1606 may be captured. While capturing each image of the third set of images, the gemstone may be rotated by 45 degrees along the pitch axis of the manipulator arm. The process of rotating the gemstone 1602 and capturing may be repeated until the entire girdle of the gemstone 1602 is captured. The girdle view may be captured for a total of 360 degrees around the gemstone diameter. The captured images are merged to obtain the girdle view 1600 of the gemstone 1602.

Figure 17:
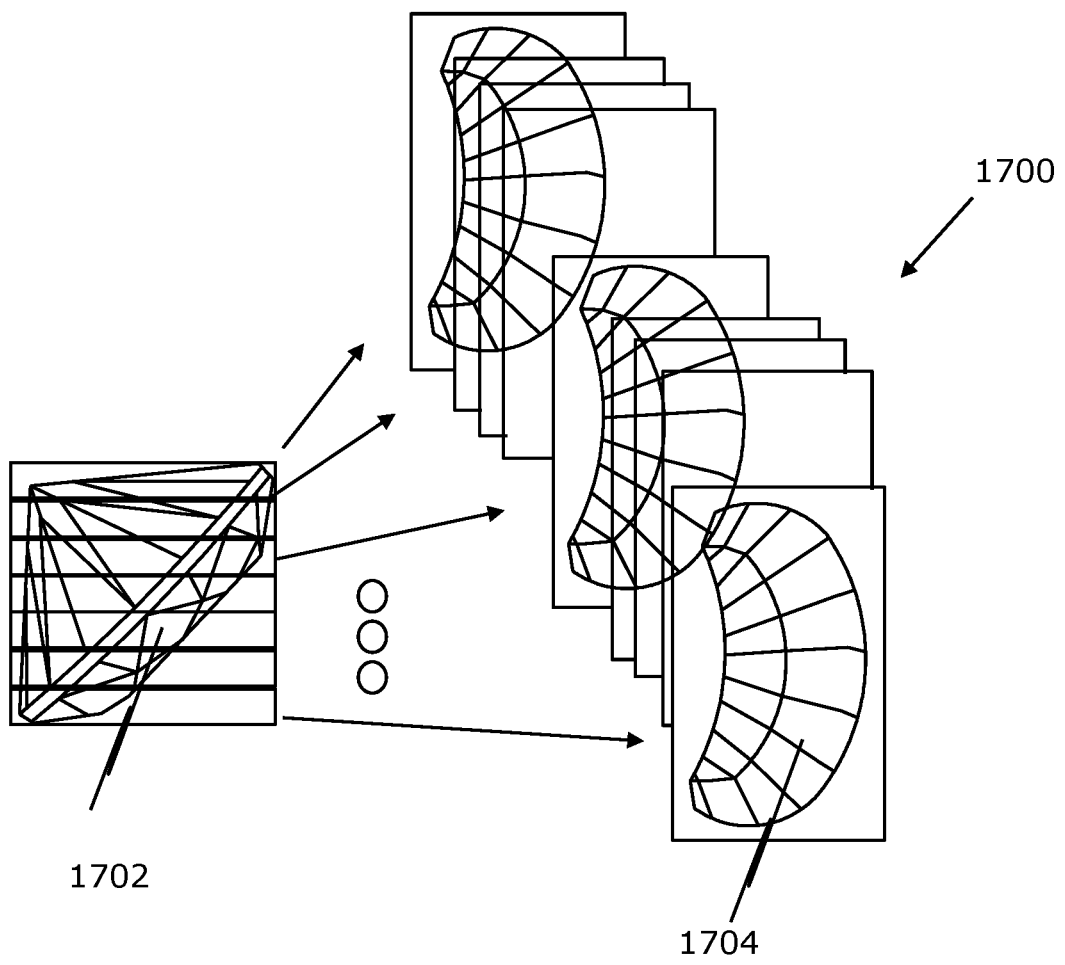
FIG. 17 is an illustration of a process for scanning the gemstone to obtain a pavilion view thereof, in accordance with some embodiments of the present disclosure.

FIG. 17 is an illustration of a process for scanning a gemstone 1702, using the dark field lighting arrangement to obtain a pavilion view 1700 thereof, in accordance with some embodiments of the present disclosure. In order to obtain the pavilion view 1700, the gemstone 1702 may be tilted by about 132 degrees along the roll axis of the manipulator arm utilizing the manipulator arm. The gemstone tilt reference may be from "0 position". The pavilion view 1700 may comprise a fourth set of images where one image is for one rotation of the gemstone. In some embodiments, the number of images in the fourth set of images may be calculated using the 3D model. In order to scan the pavilion view, an initial pavilion focus height, which may be the highest point in the gemstone at this orientation, may be calculated by using the gemstone registration and the 3D model of the gemstone. A first image 1704 may be captured and the gemstone 1702 may be rotated (around the rotation axis of the diamond) by 45 degrees and a second image may be captured. The process of rotating the gemstone 1702 and capturing image may be repeated until entire pavilion of the gemstone 1702 is captured. It may be observed from FIG. 17 that the pavilion of the gemstone 1702 is sliced to obtain the pavilion view 1700. Each slice represents one rotation of the pavilion. In some embodiments, the gemstone may be scanned down to a half stone depth and the step size may be fixed depending on the depth of field of the image capturing device and the system parameters. In some embodiments, the number of steps may be calculated from the three-dimensional model, so that an entire height from the main facet to the cullet may be covered. The captured images are merged to obtain the pavilion view 1700 of the gemstone 1702.

In some embodiments, after the table view, the tilted view, the girdle view and the pavilion view are generated, the first set of images, the second set of images, the third set of images and the fourth set of images may be processed by an artificial intelligence (AI) clarity grader and the data obtained by this process may be uploaded to a grading server. The grader server may employ AI algorithms to grade the clarity of the gemstone. Further, the AI algorithms may create a gemstone features plot.

FIG. 10, by way of specific example, is a flowchart listing steps of a method 1000 for determining cleanliness of a gemstone, grading clarity of a gemstone, grading a gemstone, mapping of a gemstone, collecting relevant parameters of a gemstone, or any combination thereof, in accordance with some embodiments of the present disclosure.

The method includes, at a step 1002, supporting the gemstone onto the holder with the holder positioned along the line of sight of the image capturing device.

The method includes, at a step 1004, selectively controlling one or more illumination arrangements to generate a plurality of illumination patterns for the gemstone.

The method includes, at a step 1006, selectively configuring the image capturing device to capture the image of each of the generated plurality of illumination patterns.

The method includes, at a step 1008, tilting the holder at different angles to obtain different orientations of the gemstone. For each tilt angle, the holder and the gemstone located thereon may also be rotated around an axis of the gemstone to obtain different orientations for each tilt angle.

The method includes, at a step 1010, selectively configuring the image capturing device to capture images at different depths of focus of the gemstone at each of the obtained different orientations thereof.

The method includes, at a step 1012, processing the captured images, to determine one or more of the following: cleanliness of the gemstone, grading clarity of the gemstone, grading the gemstone, mapping of the gemstone, and collecting relevant parameters of the gemstone.

Figure 11:
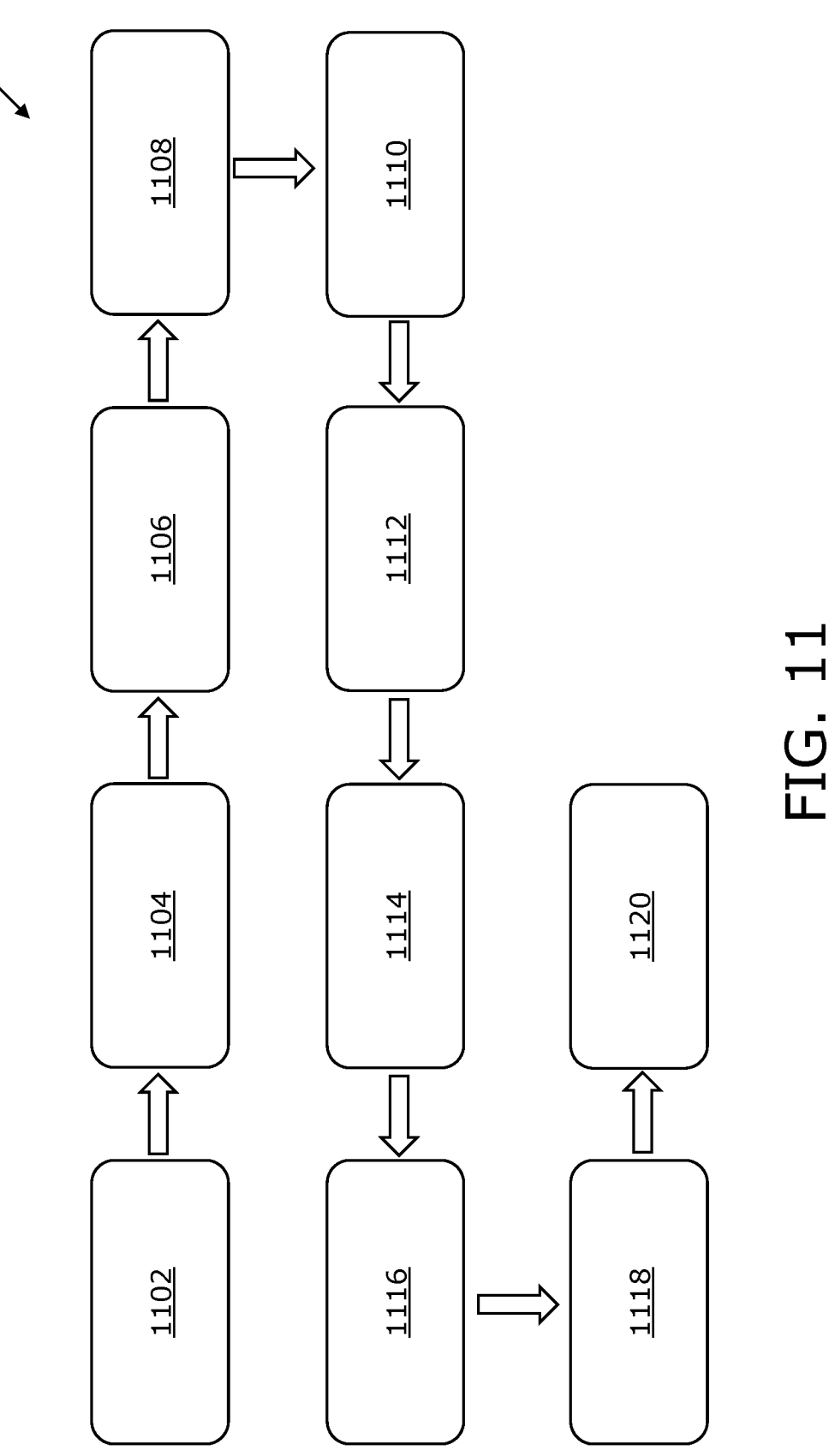
FIG. 11 is a detailed process flow for grading clarity of the gemstone, in accordance with some embodiments of the present disclosure.

FIG. 11, by way of specific example, is a detailed process flow of a method 1100 for grading the clarity of the gemstone, in accordance with some embodiments of the present disclosure.

The method includes, at a step 1102, placing a gemstone onto the holder with the holder positioned along the line of sight of the image capturing device.

The method includes, at a step 1104, autofocusing and registering gemstone position, as described above.

The method includes, at a step 1106, aligning the gemstone, e.g., by using the mechanical aligner as described above.

The method includes, at a step 1108, checking a cleanliness of the gemstone, possibly by illuminating the gemstone with the facet illumination arrangement, as described above.

The method includes, at a step 1110, scanning a table view of the gemstone at a plurality of depths of focus.

The method includes, at a step 1112, scanning a tilted view of the gemstone at a plurality of depths of focus.

The method includes, at a step 1114, scanning a girdle view of the gemstone at a plurality of depths of focus.

The method includes, at a step 1116, scanning a pavilion view of the gemstone at a plurality of depths of focus.

Steps 1110-1116 are described above.

The method includes, at a step 1118, analysing the scanned images captured in steps 1110 to 1116.

The method includes, at step 1120, determining the clarity of the gemstone.

The method includes, at a step 1122 (not shown in the flow), plotting stone features of the gemstone.

In some embodiments, the stone features, including those relating to the clarity of the gemstone, e.g., inclusions, serve as fingerprint(s)/markers of the gemstone which can be utilized for traceability of the gemstone.

In some embodiments, method 1000 and/or method 1100 include repeating the respective steps on gemstones A and B; applying a comparison between the gemstones A and B by analyzing one or more of the following: the images of gemstone A and B, the analyzed images, the stone parameters and features; then determining whether the data of gemstones A and B are a match and therefore whether a gemstone B is the same gemstone as a gemstone A that was sourced from a particular mine/source. In some embodiments, where the stored data of gemstones A and B do not match, the method further includes calculating, based on the comparing, a matching score for one or more features, such as clarity and inclusions, in gemstone A and in gemstone B, the matching score being informative of a match between the features of gemstone A and gemstone B, and, to identify gemstone B as being the same or derived from gemstone A when the matching score meets a predefined matching criteria.

Figure 12:
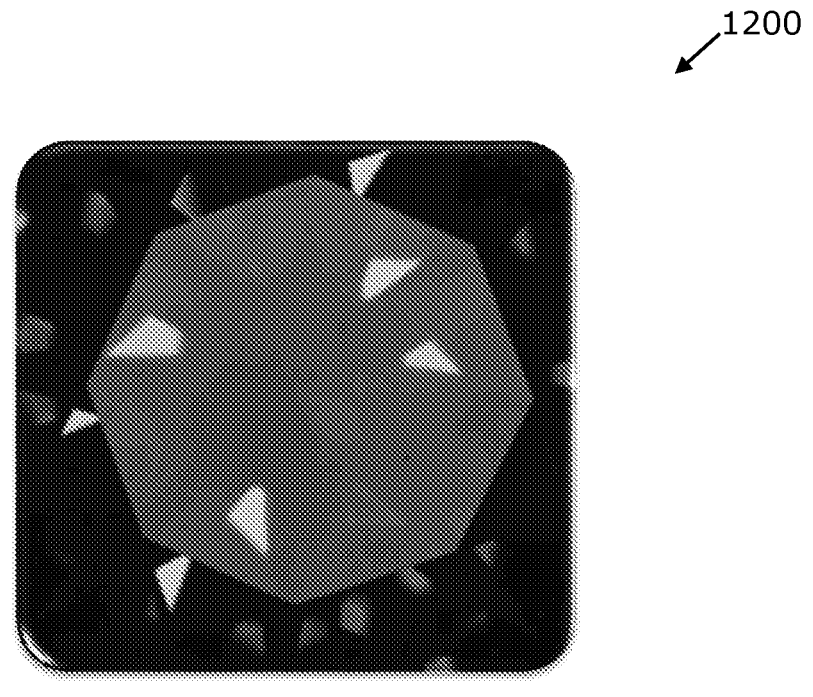
FIG. 12 is an image of a crown of the gemstone illuminated by the direct illumination arrangement, in accordance with some embodiments of the present disclosure.

FIG. 12 is an image 1200 of a crown of the gemstone illuminated by the direct illumination arrangement, in accordance with some embodiments of the present disclosure. The table and facets of the crown of the gemstone are illuminated and captured by the direct illumination arrangement.

Figure 13:
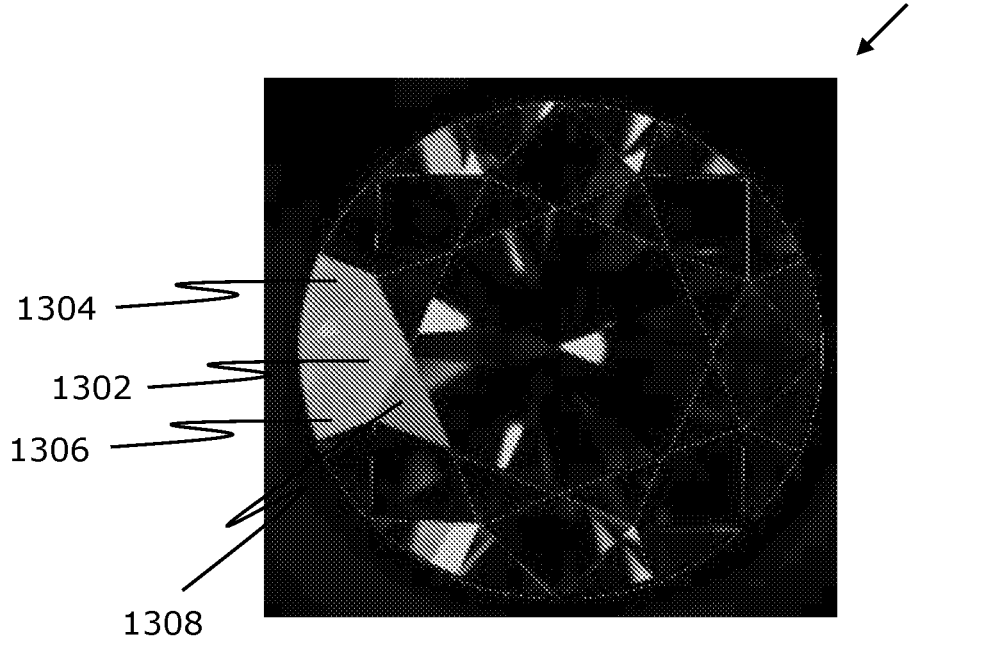
FIG. 13 is an image of the gemstone illuminated by the facet illumination arrangement, in accordance with some embodiments of the present disclosure.

FIG. 13 is an image 1300 of the gemstone illuminated by a combination of the dark-field illumination arrangement and the facet illumination arrangement, in accordance with some embodiments of the present disclosure. It may be observed that the main facet 1302, the half facets 1304 and 1306 and a star 1308 are facet illuminated and appear bright in the image 1300.

Figure 19:
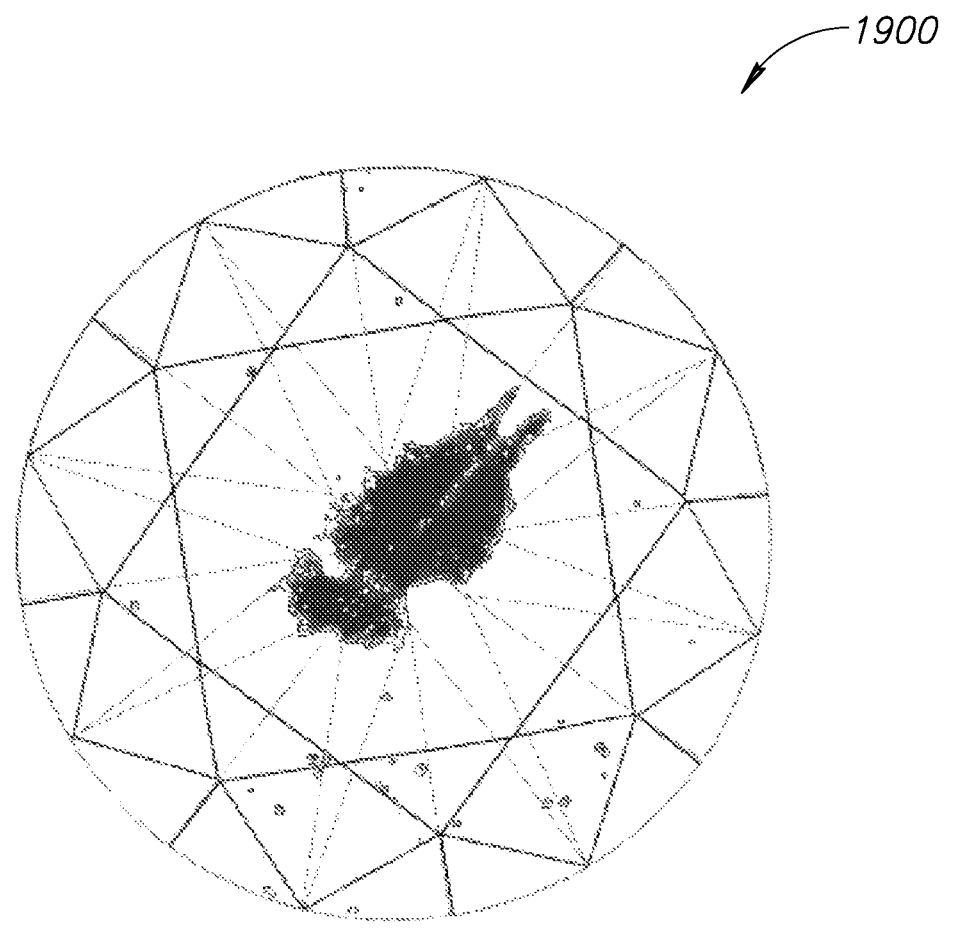
FIG. 19 is a depiction of features in the gemstone, in accordance with some embodiments of the present disclosure.

FIG. 19 is a graphical illustration 1900 of stone features in the gemstone, in accordance with some embodiments of the present disclosure. The graphical illustration 1900 depicts the stone features such as, but not limited to, inclusions, and position of the stone features in the gemstone.

The processor 126 may be disposed in communication with one or more input/output (I/O) devices through a I/O interface, such as, but not limited to user interface 128. The I/O interface may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

In some embodiments, the processor 126 may be disposed in communication with a memory (e.g., RAM, ROM, etc. not shown i) via a storage interface. The storage interface may connect to memory including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc (CD) ROMS, DVDs, flash drives, disks, and any other known physical storage media.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

The invention claimed is:

1. A system for grading a gemstone, the system comprising:

an image capturing device disposed to capture images along a line of sight;

a holder to support the gemstone thereon, the holder is adapted to be positioned to dispose the gemstone along the line of sight;

a manipulator arm having a first end and a second end, with the holder mounted at the second end thereon, wherein the manipulator arm is further configured to:

rotate along a roll axis thereof, and allow for rotation of the holder along a pitch axis thereof;

an illumination sub-system comprising:

a direct illumination arrangement, a dark-field illumination arrangement, and a facet illumination arrangement; and a controller arrangement configured to:

selectively control one or more illumination arrangements in the illumination sub-system to generate a plurality of illumination patterns for the gemstone, selectively control the manipulator arm to position the holder with a gemstone thereon for a plurality of orientations of the gemstone in relation to the image capturing device, selectively control the image capturing device to capture an image of each of the generated plurality of illumination patterns, each of the plurality of orientations and each of one or more depths of focus, and process the captured images to grade the gemstone.

2. The system according to claim 1, configured and operable to grade clarity of the gemstone with respect to one or more of the following: surface cleanliness, surface polish state and internal inclusions.

3. The system according to claim 1, comprising a mechanical aligner configured and operable to align the gemstone, while located on the holder, with respect to the image capturing device, such that a selected facet of the gemstone is perpendicular to the line of sight.

4. The system according to claim 1, wherein said direct illumination arrangement comprises a collimated light source, and a light directing arrangement to carry a collimated light beam from the collimated light source to at least one facet of the gemstone.

5. The system according to claim 4, wherein said light directing arrangement comprises a beam splitter cube and a movement mechanism configured to move the beam splitter cube into and out of the line of sight.

6. The system according to claim 4, wherein said collimated light beam generated by the direct illumination arrangement is used for verifying alignment of the gemstone with respect to the image capturing device.

7. The system according to claim 1, wherein said direct illumination arrangement comprises a light source array configured and operable to illuminate the gemstone with one or more specular and/or diffused light patterns, the image capturing device being configured to capture one or more respective images that are processed by the controller arrangement to generate a cosmetic view of the gemstone comprising one or more still images and/or one or more motion images obtained by combining two or more still images captured at different orientations of the gemstone.

8. The system according to claim 1, wherein said facet illumination arrangement comprises an array of light sources, each of the light sources being individually operable by the controller arrangement to illuminate at least a portion of a single facet of the gemstone, the image capturing device being operable to capture an image of the at least portion of the single facet while illuminated.

9. The system according to claim 1, wherein said image capturing device is adapted to capture an image of a QR-code pre-printed on a facet of the gemstone, the controller arrangement being configured to process the image of the QR-code to identify the gemstone.

10. The system according to claim 1, wherein said image capturing device comprises an iris having an adjustable opening, the controller arrangement being configured and operable to generate a control signal for optimizing the opening of the iris based on image processing to thereby reduce gemstone internal reflections in the images.

11. The system according to claim 1, comprising a plurality of holders fitting a plurality of gemstones of different sizes, the controller arrangement being configured and operable to automatically detect the holder mounted on the manipulator arm by performing image processing to images captured by the image capturing device.

12. The system according to claim 1, wherein said controller arrangement is configured to process a plurality of images of the gemstone captured in a plurality of orientations of the gemstone and merge the plurality of images to create a three-dimensional model of the gemstone.

13. The system according to claim 1, wherein said controller arrangement is configured to:

control the image capturing device to capture respective images for a gemstone A and a gemstone B, for each of the generated plurality of illumination patterns, each of the plurality of orientations and each of the one or more depths of focus, process the captured images to generate a grade A for the gemstone A and a grade B for the gemstone B, and apply a comparison between the captured images and/or the grades A and B and generate a match score indicative of a match between the gemstones A and B.

14. A method for grading a gemstone, the method comprising:

supporting the gemstone onto a holder, with the holder positioned along a line of sight of an image capturing device and a table facet of the gemstone is perpendicular to the line of sight;

selectively controlling one or more illumination arrangements to generate a plurality of illumination patterns for the gemstone;

selectively configuring the image capturing device to capture an image of each of the generated plurality of illumination patterns;

selectively tilting the holder at different angles with respect to the line of sight to obtain different orientations of the gemstone;

selectively configuring the image capturing device to capture images at different depths of focus of the gemstone at each of the obtained different orientations thereof; and processing the captured images to grade the gemstone;

the method further comprising determining autofocusing and registering gemstone 3D position, by:

a) calculating a gemstone two-dimensional image size in pixels, using a 3D model of the gemstone and system known parameters;

b) locating the gemstone in the image using the image size in pixels and system known parameters;

c) cropping the image to a calculated region of interest;

d) calculating an initial table focus height using the 3D model of the gemstone and the system parameters;

e) moving the image capturing device to the calculated initial table focus height;

f) determining table focus height by capturing an image at the initial table focus height;

g) determining the culet height position for the image capturing device using the table focus height and the 3D model;

h) capturing a culet height image from the culet height position;

i) determining the girdle height position for the image capturing device using the table focus height and the 3D model;

j) capturing a girdle height image from the girdle height position; and k) calculating and registering the 3D position of the gemstone by processing the images captured in the steps (f), (h) and (j).

* * * * *